US011618810B2

(12) United States Patent
Gopal et al.

(10) Patent No.: US 11,618,810 B2
(45) Date of Patent: *Apr. 4, 2023

(54) ANTIVIRAL ARTICLES

(71) Applicant: Ascend Performance Materials Operations LLC, Houston, TX (US)

(72) Inventors: Vikram Gopal, Houston, TX (US); Wai-shing Yung, Houston, TX (US); Albert Ortega, Houston, TX (US)

(73) Assignee: Ascend Performance Materials Operations LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/192,533

(22) Filed: Mar. 4, 2021

(65) Prior Publication Data
US 2021/0274778 A1 Sep. 9, 2021

Related U.S. Application Data

(60) Provisional application No. 63/105,051, filed on Oct. 23, 2020, provisional application No. 63/000,717, filed on Mar. 27, 2020, provisional application No. 62/985,091, filed on Mar. 4, 2020.

(51) Int. Cl.
| | | |
|---|---|---|
| *A01N 25/34* | (2006.01) | |
| *A01N 25/10* | (2006.01) | |
| *A01N 59/20* | (2006.01) | |
| *A01N 59/16* | (2006.01) | |
| *C08K 3/08* | (2006.01) | |
| *B29C 48/00* | (2019.01) | |
| *C08L 77/06* | (2006.01) | |
| *D01F 6/60* | (2006.01) | |
| *D02G 3/04* | (2006.01) | |
| *D02G 3/44* | (2006.01) | |
| *A41D 13/11* | (2006.01) | |
| *B29K 77/00* | (2006.01) | |
| *B29K 105/00* | (2006.01) | |
| *C08K 3/02* | (2006.01) | |

(52) U.S. Cl.
CPC ............... *C08K 3/08* (2013.01); *A01N 25/10* (2013.01); *A01N 25/34* (2013.01); *A01N 59/16* (2013.01); *A01N 59/20* (2013.01); *A41D 13/1192* (2013.01); *B29C 48/022* (2019.02); *C08L 77/06* (2013.01); *D01F 6/60* (2013.01); *D02G 3/047* (2013.01); *D02G 3/448* (2013.01); *D02G 3/449* (2013.01); *B29K 2077/00* (2013.01); *B29K 2105/0011* (2013.01); *B29K 2995/0077* (2013.01); *B29K 2995/0092* (2013.01); *C08K 2003/026* (2013.01); *C08K 2003/0893* (2013.01); *C08K 2201/00* (2013.01); *C08L 2201/02* (2013.01); *C08L 2201/08* (2013.01); *C08L 2203/12* (2013.01); *D10B 2331/021* (2013.01); *D10B 2401/02* (2013.01); *D10B 2401/13* (2013.01)

(58) Field of Classification Search
CPC .............................................. C08K 2003/0893
See application file for complete search history.

(56) References Cited

U.S. PATENT DOCUMENTS

| | | | |
|---|---|---|---|
| 4,701,518 A | 10/1987 | Osborn et al. | |
| 4,835,019 A | 5/1989 | White et al. | |
| 5,700,742 A | 12/1997 | Payne | |
| 5,888,526 A * | 3/1999 | Tsubai | D06M 13/355 424/641 |
| 7,169,402 B2 | 1/2007 | Gabbay | |
| 7,520,923 B2 | 4/2009 | Marcoon | |
| 8,865,605 B2 | 10/2014 | Bender et al. | |
| 9,090,995 B2 * | 7/2015 | Imashiro | D01D 5/0007 |
| 9,481,800 B2 | 11/2016 | Palza Cordero et al. | |
| 9,808,014 B2 | 11/2017 | Amestica Salazar | |
| 9,888,691 B2 | 2/2018 | Karandikar et al. | |
| 10,132,029 B2 | 11/2018 | Katzenmeier et al. | |
| 10,717,828 B2 | 7/2020 | Gabbay | |
| 10,905,740 B2 | 2/2021 | Petrak et al. | |
| 2004/0247653 A1 | 12/2004 | Gabbay | |
| 2010/0086617 A1 | 4/2010 | Shigita et al. | |
| 2015/0233049 A1* | 8/2015 | Delattre | A01N 25/10 8/115.64 |
| 2020/0102673 A1 | 4/2020 | Dong et al. | |
| 2020/0187498 A1* | 6/2020 | Osborn | A01N 25/34 |

FOREIGN PATENT DOCUMENTS

| | | |
|---|---|---|
| WO | 01/74166 A1 | 10/2001 |
| WO | 2005/020689 A1 | 3/2005 |
| WO | 2019/203854 A1 | 10/2019 |
| WO | 2020122717 A1 | 6/2020 |

OTHER PUBLICATIONS

New World Encylcopedia: Nylon, https://www.newworldencyclopedia.org/entry/Nylon, 3 pgs.*
Savas et al., Polymer Degradation and Stability, 195, 2019, 101-109.*

* cited by examiner

*Primary Examiner* — Kyle A Purdy
(74) *Attorney, Agent, or Firm* — Cozen O'Connor

(57) ABSTRACT

Provided is a textile made of filament yarn comprising a polymer composition that is durable and reusable having permanent or near-permanent antiviral properties and that includes a polymer, a metal ion, preferably a zinc and/or copper ion, and an optional phosphorus compound, wherein fibers and/or fabric formed from the polymer composition demonstrate antiviral properties and wherein the polymer is hygroscopic. The present disclosure also describes methods of forming the polymer compositions and methods of preparing fibers from the polymer composition.

16 Claims, 8 Drawing Sheets

Influenza A virus (H1N1)

FIG. 1D

SARS-CoV-2

ANTIVIRAL ARTICLES

CROSS-REFERENCE TO RELATED APPLICATIONS

This application claims priority to U.S. Provisional Application No. 62/985,091, filed Mar. 4, 2020, U.S. Provisional Application No. 63/000,717, filed Mar. 27, 2020, U.S. Provisional Application No. 63/105,051, filed Oct. 23, 2020, each of which is incorporated herein by reference.

FIELD

The present disclosure relates to an antiviral article having an effective amount of metal ions incorporated within a hygroscopic polymer to deactivate viruses. The antiviral property of the article is robust, durable, and/or washable which may allow the article to be reusable.

BACKGROUND

There is a growing interest in fabrics having antiviral and/or antimicrobial properties. In an attempt to achieve such properties, conventional techniques have applied a number of treatments or coatings to fibers to impart antimicrobial properties to fabrics. Compounds containing copper, silver, gold, or zinc, either individually or in combination, have been used in these applications—typically in the form of a topical coating treatment—to effectively combat pathogens such as bacteria, mold, mildew, virus, spores, and fungus. These types of antimicrobial fibers and fabrics may be used in many industries including healthcare, hospitality, military, and athletics, among others. However, these coated fibers have not demonstrated adequately permanent antiviral properties. Furthermore, these coated fibers and fabrics have struggled to meet many other requirements of these applications.

For example, in the healthcare and hospitality industries, certain fabrics are required to be sanitary at all times. To comply with these sanitation standards, the fabrics are subject to daily washing and, often times, bleaching. Thus, in many applications repeated cycles of use, washing, or soaking are quite common. Unfortunately, conventional fibers and fabrics have been found to deteriorate and lose antiviral and/or antimicrobial properties during repeated uses and/or wash cycles.

Additionally, many of the conventional antimicrobial fabrics do not demonstrate sufficient antiviral and/or antimicrobial properties, nor do they retain these properties when the fabrics are dyed. Fabrics are often dyed with or in various colors by submerging the fabric in a dye bath. In many cases, however, antimicrobial additives are extracted from the fibers/fabric, e.g., during dyeing operations, which causes the antimicrobial properties to deteriorate. Further, the antimicrobial treatments/coatings that may be extracted from conventional fabrics may have undesired environmental consequences.

As one example of conventional antimicrobial yarns and fabrics, U.S. Pat. No. 6,584,668 discloses durable non-electrically conductive metal treatments applied to yarns and textile fabrics. The durable non-electrically conductive metal treatments are coatings or finishes applied to yarns and textile fabrics. The metal treatments may include silver and/or silver ions, zinc, iron, copper, nickel, cobalt, aluminum, gold, manganese, magnesium, and the like. The metal treatments are applied to the exterior surface of the yarn or fabric as a coating or film.

Some synthetic fibers having antimicrobial fibers are also known in the art. For example, U.S. Pat. No. 4,701,518 discloses an antimicrobial nylon prepared in water with a zinc compound phosphorus compound to form carpet fibers. The process produces nylon fibers for carpets having 18 denier per filament (dpf), and are prepared by conventional melt polymerization. Such carpet fibers typically have average diameters that are well above 30 microns, which are generally unsuitable for next-to-skin applications. Furthermore, the conventional additives added to polymer compositions to impart antimicrobial properties in the synthetic fibers made therefrom have been found to reduce the relative viscosity in the polymer compositions. This reduced relative viscosity produces further difficulty in producing synthetic fibers from the polymer composition, e.g., increased difficulty in extruding the polymer composition.

As another example, US Publication No. 2020/0102673 discloses antimicrobial fibers that include antimicrobial nanoparticles dispersed substantially uniformly in a polymer matrix. Textiles and other materials can be formed from such fibers. The fibers may be formed via a masterbatch process or in a process wherein the antimicrobial nanoparticles, polymeric component, and additive(s) are melt processed together directly. Devices can be at least partially formed from polymer materials that include antimicrobial nanoparticles dispersed substantially uniformly in a polymer matrix.

Also, U.S. Pat. No. 10,201,198 discloses a protective mask with an ultrafine fibrous coating. The ultrafine fibrous coating includes partially gelled submicron fibers interweaved with nanofibers and a biocide encapsulated in, surface-attached onto, blended with, physically trapped, and/or chemically linked to the submicron fibers and nanofibers. In an example, a microfibrous substrate with the coating assembles with other microfibrous substrates to form a protective mask having N95 level of protection and bacteria-killing capability.

Although some references may teach the use of antimicrobial fibers and fabrics, a need exists for antiviral polymer compositions that retain antiviral properties, e.g., have improved antiviral retention rates, and/or resistance to the extraction of antiviral additives therefrom, while also being able to achieve thinner fiber diameters and/or denier. There is a further need for antiviral polymer compositions suitable producing high-contact products, which may contribute to transmission of viruses.

SUMMARY

In some cases, the present disclosure relates to an antiviral article comprising a textile that is durable, washable, reusable and has an effective amount of one or more metal ions. Textile may be a woven or knitted textile. Several end use are described herein for the article, and these uses include but are not limited to a mask, wipe, gown, towel, protective clothing, or protective net. In some cases, the present disclosure relates to an antiviral article comprising a textile having a basis weight of greater than or equal to 15 grams per square meter (gsm), e.g., from 15 to 320 gsm, the textile comprising filament yarn comprising one or more hygroscopic polymers each having an average fiber diameter from 1 to 20 microns, e.g., from 10 to 20 microns, and an effective amount of one or more metal ions incorporated within the one or more hygroscopic polymers for deactivating viruses exposed to the article. In one embodiment, the concentration of the one or more metal ions is greater than or equal to 200 wppm, e.g., from 200 wppm to 1,000 wppm. Hygroscopic polymers may comprise a polyamide, polyurethane, polycarbonate, polyesters, polyacrylates, or acrylonitrile butadiene styrene, and preferably comprise at least polyamide. The polyamide may be a reaction product of at least one $C_4$ to $C_{16}$ aliphatic dicarboxylic acid, cyclo dicarboxylic acid, or aromatic dicarboxylic acid and at least one alkylene diamine having from 2 to 16 carbon atoms or an aromatic diamine. The hygroscopic polymers absorbs more than 0.3% of moisture based on the weight of the hygroscopic polymer. The metal ions may comprise zinc, copper, or silver in an effective amount. The concentration of the one or more metal ions may exceed the concentration of one or more metal compounds, which may comprise oxides, carbonates, stearates, pyrithiones, or adipates. In some embodiments, the article is reusable and the article has a metal ion retention rate of greater than or equal to 65%. The one or more metal ions are effective at deactivating several different types of viruses, including adenovirus, a herpesvirus, a poxvirus, a rhinovirus, a coxsackievirus, an enterovirus, a morbillivirus, a coronavirus, an influenza A virus, an avian influenza virus, a swine-origin influenza virus, or an equine influence virus. The effective of the one or more metal ions provides that the exhibits at least a 1-log reduction of virus, including human coronavirus, H1N1, or Sars-CoV-2, after a period of 60 minutes according to ISO 18184:2019. In some embodiments, the filament yarn may comprises an phosphorus compound and wherein the phosphorus compound comprises benzene phosphinic acid, phosphorous acid, or manganese hypophosphite, or combinations thereof. When the metal ion is a zinc ion and wherein the molar ratio of the phosphorus to the zinc ranges from 0.01:1 to 3:1.

In some cases, the present disclosure relates to an antiviral article comprising a textile having a basis weight of greater than or equal to 15 grams per square meter (gsm), e.g., from 15 to 320 gsm, the textile comprising filament yarn comprising a polyamide having an average fiber diameter from 1 to 20 microns, e.g., from 10 to 20 microns, and an effective amount of one or more metal ions incorporated within the polyamide for deactivating viruses exposed to the article. The polyamide may be a reaction product of at least one $C_4$ to $C_{16}$ aliphatic dicarboxylic acid, cyclo dicarboxylic acid, or aromatic dicarboxylic acid and at least one alkylene diamine having from 2 to 16 carbon atoms or an aromatic diamine. Preferred polyamides include PA-4T/41; PA-4T/61; PA-5T/5I; PA-6; PA-6,6; PA-6,6/6; PA-10; PA-12; PA-6,10; PA-6,12; PA-6,6/6T; PA-6T/61; PA-6T/6116; PA-6T/6; PA-6T/61166; PA-6T/MPMDT; PA-6T/66; PA-6T/610; PA-10T/612; PA-10T/106; PA-6T/612; PA-6T/10T; PA-6T/10I; PA-9T; PA-10T; PA-12T; PA-10T/10I; PA-10T/12; PA-10T/11; PA-6T/9T; PA-6T/12T; PA-6T/10T/61; PA-6T/6116; PA-6T/6I/12; and copolymers, blends, mixtures and/or other combinations thereof. The metal ions may comprise zinc, copper, or silver in an effective amount, and preferably comprise zinc ions (Zn 2+). The concentration of the one or more metal ions may exceed the concentration of one or more metal compounds, which may comprise oxides, carbonates, stearates, pyrithiones, or adipates. In some embodiments, the article is reusable and the article has a metal ion retention rate of greater than or equal to 65%. The one or more metal ions are effective at deactivating several different types of viruses, including adenovirus, a herpesvirus, a poxvirus, a rhinovirus, a coxsackievirus, an enterovirus, a morbillivirus, a coronavirus, an influenza A virus, an avian influenza virus, a swine-origin influenza virus, or an equine influence virus. The effective of the one or more metal ions provides that the exhibits at least a 1-log reduction of virus, including human coronavirus, H1N1, or Sars-CoV-2, after a period of 60 minutes according to ISO 18184:2019. In some embodiments, the filament yarn may comprises an phosphorus compound and wherein the phosphorus compound comprises benzene phosphinic acid, phosphorous acid, or manganese hypophosphite, or combinations thereof. When the metal ion is a zinc ion and wherein the molar ratio of the phosphorus to the zinc ranges from 0.01:1 to 3:1.

In some embodiments, the present invention is directed to antiviral filament yarn comprising one or more hygroscopic polymers, preferably polyamide, each having an average fiber diameter from 1 to 20 micron, and an effective amount of one or more metal ions incorporated within the one or more hygroscopic polymers for deactivating viruses exposed to the yarn. The filament yarn may be woven or knitted into a textile. In one embodiment, the concentration of the one or more metal ions is greater than or equal to 200 wppm, e.g., from 200 wppm to 1,000 wppm. In one embodiment, the concentration of the one or more metal ions is greater than or equal to 200 wppm, e.g., from 200 wppm to 1,000 wppm. Although polyamide is preferred, the hygroscopic polymer may also comprise polyurethane, polycarbonate, polyesters, polyacrylates, or acrylonitrile butadiene styrene. In one embodiment, the filament yarn comprises linear denier per filament less than or equal to 12 dpf, e.g., from 1 dpf to 12 dpf.

BRIEF DESCRIPTION OF THE DRAWINGS

The following is a brief description of the drawings, which are presented for the purposes of illustrating the exemplary embodiments disclosed herein and not for the purposes of limiting the same.

FIGS. 1D and 1E are graphs for the virus recovery for the fabrics described in Example 1;

DETAILED DESCRIPTION

Introduction

Figure 1A:
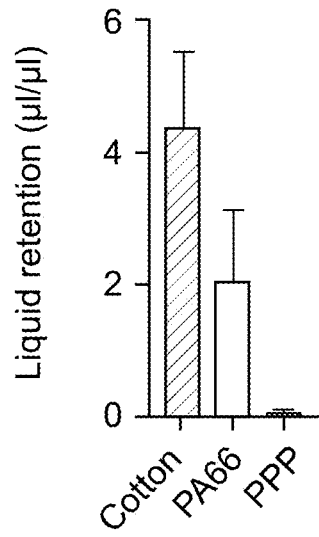
FIG. 1A is graph showing the liquid retention for fabrics described in Example 1.

As discussed above, some conventional antiviral (and/or antimicrobial) polymer compositions, fibers and fabrics utilize antiviral (and/or antimicrobial) compounds to inhibit viruses and other pathogens. For example, some fabrics may include antimicrobial additives, e.g., silver, coated or applied as a film on an exterior layer. However, it has been found that these treatments or coatings often present a host of problems. The inventors have found that, in some conventional applications where antiviral additives are components of the fiber, the antiviral additives may extract out of the fibers/fabric during the dyeing process, which adversely affects the antiviral properties of the fiber and detrimentally places the additives into the environment. In addition to this problem, the inventors have discovered that some antiviral additives may negatively impact the relative viscosity of the resultant polymer composition.

Some references, e.g., carpet fiber-related references, have disclosed the use of an antimicrobial nylon prepared in water with a zinc compound and phosphorus compound to form the carpet fibers. These references, however, relate to higher denier levels (for example, greater than 12 dpf) and/or higher fiber diameter (for example, greater than 20 microns) fibers/filaments. These teachings, however are typically not relevant to other types of fibers, e.g., those used in next-to-skin textiles, woven textiles, knitted textiles, filters, masks, or other medical devices. Carpet fibers are formed via entirely different, non-analogous processes equipment, which results in entirely different products. In view of these significant differences, the teachings of such carpet fiber references are not typically considered relevant to other types of fibers/filaments. More specifically, in carpet fiber production, formulations having different amounts, e.g., higher amounts, of phosphorus compounds (optionally with zinc compounds) are employed for their ability to increase relative viscosity of the polymer. However, phosphorous compounds are not typically used in other small fiber polymer formulations because the use and the accompanying relative viscosity build might contribute to processability issues. Stated another way, the equipment and processes cannot process the carpet formulation (with the increased relative viscosity), because it could impede processability and make production difficult if not impossible. In contrast to carpet formulations, the polyamide compositions disclosed herein comprise a unique combination of zinc and/or copper and optionally phosphorus, each preferably in particular amounts, e.g., lower amounts, that retards or eliminates the viscosity build that is associated with conventional carpet fiber formulations (and also provides additional synergistic benefits). As a result, the formulations disclosed herein are surprisingly capable of forming much thinner fibers, e.g., in the form of fibers, yarns, or fabric webs, having antiviral properties, while avoiding the aforementioned processing problems.

Also, although some references directly mix antiviral and/or antimicrobial agents with fibers, leathers, or plastics, such processes do not address/solve problems of deterioration of the antiviral properties of the products, e.g., via extraction loss. Still other conventional antiviral fabrics have been found to have insufficient strength for apparel applications, e.g., an inability to withstand significant washing, and are unable to retain antimicrobial properties over the product lifetime.

It has now been discovered that an effective amount of one or more metal ions, preferably zinc and/or copper ions, provides for efficacy for deactivating virus when incorporated within a hygroscopic polymer. These hygroscopic polymers are made into filament yarns and woven or knitted into textiles. The textiles are made into different articles, such as clothing pieces, medical gowns, medical masks, medical drapes, patient transfer slip sheets, curtains, bedding (e.g., bedsheets, a duvet, a duvet cover, a pillow, or a pillow cover), luggage (e.g., a suitcase or a garment bag), or footwear (e.g., a shoe upper, a shoe lining, or sewing thread for a shoe).

The use of hygroscopic polymers having ions incorporated therein provides a robust and durable fiber/filament yarn that allows the textile to retain its antiviral efficacy. And the textiles may be finished or dyed and still retain antiviral efficacy. As a result, a synergistic combination of ions incorporated into the hygroscopic polymer, antiviral efficacy, and retention of each is surprisingly achieved.

In some embodiments, the use of the phosphorus compound in the specific amounts may allow the metal ions, preferably zinc and/or copper ions to be more stably disposed in the polymer matrix and, as such, may retard leaching of the zinc/copper compound from the fibers/yarns/fabrics, e.g., during washing and/or dyeing. Stated another way, the polymer composition may have certain amounts of a zinc/copper compound and a phosphorus compound embedded in the polymer matrix such that the polymer composition maintains a higher relative viscosity and retains antimicrobial properties during and after dyeing. In addition, the use of an optional phosphorus compound in the specific amounts may work with the zinc/copper to improve the relative viscosity of the polymer matrix.

As a result, the disclosed filament yarn made from the hygroscopic polymer advantageously eliminate the need for a topical antiviral treatments to the textile. This provides a "built-in" antiviral properties. And these antiviral properties beneficially will not extract out, e.g., wash away, after dyeing or repeated use. This allows the filament yarns to be biocompatible and generally regarded as non-toxic. The term "biocompatible" means compatible with living tissue and not producing toxic, injurious or immunological when exposed to living tissue.

In addition, the disclosed polymer compositions are able to maintain desired relative viscosity levels, which provides for advantageous processing benefits. Further, the antiviral fibers (or other antiviral product) can maintain colorfastness (a characteristic that relates to a material's resistance to color fading or running) and durability. Unlike conventional antiviral fabrics, the present fibers and fabrics substantially retain their antiviral activity from leaching and extraction during and after dyeing. Further, the present fibers have significantly lower denier and lower average diameter, which beneficially makes them useful in many end applications, e.g., apparel and filtration, where the thicker, higher denier fibers are unsuitable.

Thus, it has now been found that particular substrates, e.g., polyamides, are able to contain and retain the antiviral/antimicrobial agents and that have high levels of hydrophilicity and/or hygroscopy, present the synergistic ability to attract such liquid media and to then reduce or inhibit the growth, generally referred to as deactivation, of the viruses, as well as microbials that are contained therein.

In addition, as a result of the formulations disclosed herein, the disclosed polymer compositions, fibers, and/or fabrics do not need to be (and are not) gelled, which adds complications to processing, e.g., compositional requirements to achieve the gelling and/or process requirements to do the same, as well as the inability to achieve high throughput. Thus, the disclosed polymers, fibers, and/or fabrics provide the additional advantages of not including components necessary for gelling as well as elimination of production steps related to the gelling process.

The present disclosure relates to a polymer composition, which may in some cases be used to form antiviral fibers, as well as yarns, and/or fabrics formed therefrom. The polymer composition comprises antiviral agents, which are efficacious and provide for significant resistance to extraction from the fiber. The polymer composition comprises a polymer, zinc ions (provided to the composition via in a zinc compound), and/or copper ions (provided to the composition via a copper compound) and optionally phosphorus (provided to the composition via a phosphorus compound). The polymer may be present in an amount ranging from 50 wt. % to 99.9 wt. %; the zinc/copper ions may be present in an amount ranging from 10 wppm to 20,000 wppm, e.g., preferably from 200 to 1000 wppm; and the phosphorus may be present in an amount less than 1 wt. %. The polymer composition may be used to form fibers, and, in addition to improved antiviral performance, the fibers demonstrate superior zinc/copper extraction rates, e.g., less than 35% zinc/copper extracted, when tested in a dye bath test (as described herein). The fibers may demonstrate superior zinc/copper retention rates.

In some embodiments, specific molar ratios of phosphorus to zinc and/or copper ions are employed, e.g., wherein the phosphorus to zinc and/or copper molar ratio is at least 0.01:1. Without being bound by theory, by maintaining a particular phosphorus to zinc and/or copper balance, the polymer surprisingly achieves desirable relative viscosity levels, e.g., at least 10, while still maintaining the aforementioned antiviral properties.

The disclosure also relates to a process for making antiviral fibers (or other antiviral product). The process comprises the steps of providing the polymer composition having antiviral properties, and forming the polymer composition into fibers and into filament yarns for textile production by woven or knitting methods. It was also beneficially found that providing zinc (via a zinc compound) and/or copper (provided to the composition via a copper compound) and optionally phosphorus (via a phosphorus compound) to the polymer composition during the production process of the fibers, e.g., to the aqueous monomer solution, produces fibers with antiviral agents evenly dispersed throughout the entire fiber. In conventional processes, a silver coating is applied to the outer surface of the fabric to impart antiviral properties to the fabric. However, the silver coating is not dispersed throughout the fabric and is more susceptible to leaching components, e.g., silver, into the environment. Advantageously, the present polymer composition does not give rise to toxicity because it does not elute the antiviral agents, nor does it include any toxic components, e.g., silver. Additionally, antiviral fibers (or other antiviral product) formed the present polymer composition do not require a separate application step since the antiviral agents are permanently bound to the polymer matrix.

Hygroscopic Polymers

In one embodiment the filament yarn comprises hygroscopic polymers. The textile product may comprises greater than 20% of filament yarns comprising hygroscopic polymers, e.g., greater than 30%, greater than 50%, greater than 75%, greater than 90%, or greater than 99%. In certain embodiments, all the filament yarns that are woven or knitted into the textile may comprise hygroscopic polymers. As used herein, the term "hygroscopic" refers to polymers that absorb moisture and includes hydrophilic polymers. The inventors have found that the ability to absorb moisture improves the antiviral efficacy of the metal ions by retaining the virus within the textile to allow for deactivation. In particular, the filament yarn made from hygroscopic polymers absorbs and/or attracts liquid media that carry viruses and/or microbials, e.g., saliva or mucous. The employment of the disclosed antimicrobial/antiviral agents in such substrates, e.g., in the polymer matrices thereof, can be used to more effectively combat the viruses and/or microbials, versus a less hydrophilic substrate.

The hygroscopic polymers surprisingly may benefit from having increased moisture absorption. In addition, the inventors have found that certain hydrophilic substrates may better attract liquid media that carry viruses and/or microbials, e.g., saliva or mucous. Also, it is theorized that a polymer of increased hydrophilicity and/or hygroscopy both may better attract liquid media that carry microbials and/or viruses, e.g., saliva or mucous, and may also absorb more moisture, e.g., from the air, and that the increased moisture content allows the polymer composition and the antiviral/antimicrobial agent to more readily limit, reduce, or inhibit infection and/or pathogenesis of a virus. For example, the moisture may dissolve an outer layer, e.g., capsid, of a virus, exposing the genetic material, e.g., DNA or RNA, of the virus. The exposed genetic material is more susceptible to deactivation by other components of the polymer composition, e.g., the zinc compound, phosphorus compound, and/or copper compound.

In some cases, the hygroscopic polymers used herein absorbs more than 0.3% of moisture based on the weight of the polymer (dry). In preferred embodiments, the hygroscopic polymers used herein is capable of absorbing more than 0.5%, e.g. more than 1%, more than 2%, more than 3%, more than 4%, more than 5%, more than 6%, or more than 7%. In contrast hydrophobic polymers, in particular polyolefins, polystyrene, polyvinyl chloride and polyphenylsulfone, have lower absorption and poor viral efficacy. Using a natural or synthetic material that absorbs too much moisture should be avoided so that virus are not held within the textile. Thus, suitable ranges for moisture absorption based on the weight of the polymer may be from 0.3% to 10%, including subranges, such as preferred ranges from 0.3% to 7% or from 0.5% to 5%. These ranges provide for moisture absorption dimensional stability. The hygroscopy of a polymer may be measured by saturation.

Hygroscopic polymers as embodied by this disclosure include thermoplastic polymers that include but are not limited to, polyamide, polyurethane, polycarbonate, polyesters, polyacrylates, or acrylonitrile butadiene styrene. It is envisioned that the filament yarns may be made of a combination of different hygroscopic polymers. It is preferred that at least 50% of the filament yarns are made of a polyamide, e.g., at least 60%, at least 75% or at least 90%. In one embodiment, the filament yarns do not contain natural fibers, such as cotton, hemp and/or wool.

Suitable polyesters include polyethylene terephthalate (PET) and polybutylene terephthalate (PBT). The polyesters may be blended with another hygroscopic polymer. In some embodiments, there may be a blend of polycarbonate and polybutylene terephthalate (PC-PBT) or a blend of polycarbonate and polyethylene terephthalate (PC-PET).

Polyamide is a particularly advantageous hygroscopic polymers to be used for filament yarn for textile production. Polyamides produce a strong fiber that is thermal stable up to 300° C. exhibits a non-drip burning characteristic that is beneficial e.g., in military or automotive textile applications. The polyamide may be the reaction product, e.g. from polycondensation, of at least one $C_4$ to $C_{16}$ aliphatic dicarboxylic acid, cycloaliphatic dicarboxylic acid or aromatic dicarboxylic acid such as terephthalic acid and at least one alkylene diamine having from 2 to 16 carbon atoms, cycloaliphatic diamine or an aromatic diamine. The aliphatic monomers may be linear or branched, with linear aliphatic monomers being preferred. The mass ratio of the dicarboxylic acid to diamine is from 60/40 to 90/10, with equimolar ratios being preferred. In one embodiment, the polyamide may be a reaction product of adipic acid and hexamethylenediamine. In other embodiments, polyamides be produced through the ring-opening polymerization of lactams, such as polyamides produced from propriolactam, butyrolactam, valerolactam, and caprolactam. For example, in some embodiments, the polyamide is a polymer derived from the polymerization of caprolactam. In those embodiments, the polymer comprises at least 10 wt. % caprolactam, e.g., at least 15 wt. %, at least 20 wt. %, at least 25 wt. %, at least 30 wt. %, at least 35 wt. %, at least 40 wt. %, at least 45 wt. %, at least 50 wt. %, at least 55 wt. %, or at least 60 wt. %. In some embodiments, the polymer includes from 10 wt. % to 60 wt. % of caprolactam, e.g., from 15 wt. % to 55 wt. %, from 20 wt. % to 50 wt. %, from 25 wt. % to 45 wt. %, or from 30 wt. % to 40 wt. %. In some embodiments, the polymer comprises less than 60 wt. % caprolactam, e.g., less than 55 wt. %, less than 50 wt. %, less than 45 wt. %, less than 40 wt. %, less than 35 wt. %, less than 30 wt. %, less than 25 wt. %, less than 20 wt. %, or less than 15 wt. %. Furthermore, the polymer composition may comprise the polyamides produced through the copolymerization of a lactam, for example, the product of the copolymerization of a caprolactam with PA-6,6.

In some cases, the polyamide the polyamide may comprise PA-4T/4I; PA-4T/6I; PA-5T/5I; PA-6; PA-6,6; PA-6,6/6; long chain polyamide (such as PA-10; PA-12; PA-6,10; PA-6,12, as well as other known long chain variants optionally including aromatic components, e.g., T and I components); PA-6,6/6T; PA-6T/6I; PA-6T/6I16; PA-6T/6; PA-6T/6I166; PA-6T/MPMDT (where MPMDT is polyamide based on a mixture of hexamethylene diamine and 2-methylpentamethylene diamine as the diamine component and terephthalic acid as the diacid component); PA-6T/66; PA-6T/610; PA-10T/612; PA-10T/106; PA-6T/612; PA-6T/10T; PA-6T/10I; PA-9T; PA-10T; PA-12T; PA-10T/10I; PA-10T/12; PA-10T/11; PA-6T/9T; PA-6T/12T; PA-6T/10T/6I; PA-6T/6I/6; PA-6T/6I112; and copolymers, blends, mixtures and/or other combinations thereof. The polymer composition may, in some embodiments, comprise a combination of polyamides. By combining various polyamides, the final composition may be able to incorporate the desirable properties, e.g., mechanical properties, of each constituent polyamides. For example, in some embodiments, the polyamide comprises a combination of PA-6, PA-6,6, and PA-6,6/6T. In these embodiments, the polyamide may comprise from 1 wt. % to 99 wt. % PA-6, from 30 wt. % to 99 wt. % PA-6,6, and from 1 wt. % to 99 wt. % PA-6,6/6T. In some embodiments, the polyamide comprises one or more of PA-6, PA-6,6, and PA-6,6/6T. In some aspects, the polymer composition comprises 6 wt. % of PA-6 and 94 wt. % of PA-6,6. In some aspects, the polymer composition comprises copolymers or blends of any of the polyamides mentioned herein. It is preferred at least 50% the filament yarns are made of PA-6,6, e.g., at least 60%, at least 75% or at least 90%.

In general, filament yarns comprise a hygroscopic polymer in an amount ranging from 50 wt. % to 100 wt. %, e.g., from 50 wt. % to 99.99 wt. %, from 50 wt. % to 99.9 wt. %, from 50 wt. % to 99 wt. % from 55 wt. % to 100 wt. %, from 55 wt. % to 99.99 wt. %, from 55 wt. % to 99.9 wt. %, from 55 wt. % to 99 wt. %, from 60 wt. % to 100 wt. %, from 60 wt. % to 99.99 wt. %, from 60 wt. % to 99.9 wt. %, from 60 wt. % to 99 wt. %, from 65 wt. % to 100 wt. %, from 65 wt. % to 99.99 wt. %, from 65 wt. % to 99.9 wt. %, or from 65 wt. % to 99 wt. %. In terms of upper limits, the polymer composition may comprise less than 100 wt. % of the polymer, e.g., less than 99.99 wt. %, less than 99.9 wt. %, or less than 99 wt. %. In terms of lower limits, the polymer composition may comprise greater than 50 wt. % of the polymer, e.g., greater than 55 wt. %, greater than 60 wt. %, or greater than 65 wt. %. In some cases, the composition comprises metal ions, preferably zinc and other additives, as discussed herein, and the balance polymer.

Some polymer compositions described herein surprisingly may benefit from increased hygroscopy. An increase in hygroscopy may be achieved in the selection and/or modification the polymer. In some embodiments, the polymer may be a hygroscopic polymer described above, in particular polyamide, which has been modified to increase hygroscopy. In these embodiments, a functional endgroup modification on the polymer may increase hygroscopy. For example, the polymer may be PA-6,6, which has been modified to include a functional endgroup that increases moisture absorption within a desired range.

The inventors have found that the content of amine end groups (AEG) may have a surprising effect on the performance of the polymer compositions, fibers, and fabrics. As one example, the AEGs have been found to improve the ability to dye fibers and/or fabrics. The polymer composition may have an AEG content ranging from 1 µeq/gram to 105 µeq/gram, e.g., from 1 µeq/gram to 75 µeq/gram, from 1 µeq/gram to 55 µeq/gram, from 5 µeq/gram to 50 µeq/gram, or from 15 µeq/gram to 40 µeq/gram. In terms of upper limits, the polymer composition may have an AEG content less than 105 µeq/gram, e.g., less than 100 µeq/gram, less than 90 µeq/gram, less than 75 µeq/gram, less than 55 µeq/gram, less than 50 µeq/gram, less than 45 µeq/gram, less than 40 µeq/gram, less than 35 µeq/gram, less than 30 µeq/gram, or less than 25 µeq/gram. In terms of lower limits, the polymer composition may have an AEG content greater than 1 µeq/gram, e.g., greater than 5 µeq/gram, greater than 10 µeq/gram, greater than 15 µeq/gram, greater than 20 µeq/gram, greater than 25 µeq/gram, greater than 35 µeq/gram, greater than 40 µeq/gram, or greater than 50 µeq/gram.

In some aspects, the polyamide can formed by polymerization condensing of an aqueous solution of at least one diamine-carboxylic acid salt is heated to remove water. This aqueous solution is preferably a mixture which includes at least one polyamide-forming salt in combination with metal compound, such as a zinc, copper, or silver compound. Once polymerized is completed the ionization of the metal compounds occurs and the polyamide contains metal ions. The absorption of certain moisture levels promotes the ionization. Thus, the embodiments of the present invention incorporate the metal ions into the hygroscopic polymer, preferably during polymerization and are not later added by a topical treatment.

Metal Ions

As noted above, the filament yarns to produce the textile comprise metal ions, preferably divalent metal ions. The metal ions are selected based as its antiviral efficacy as well as its biocompatibility. It is theorized that the metal ions disrupts the replicative cycle of the virus. For example, the zinc ions may interfere with (e.g., inhibit) viral protease or polymerase activity. Further discussion of the effect of zinc ions on viral activity is found in Velthuis et al., *Zn Inhibits Coronavirus and Arterivirus RNA Polymerase Activity In Vitro and Zinc Ionophores Block the Replication of These*

*Viruses in Cell Culture*, PLoS Pathogens (November 2010), which is incorporated herein by reference. Suitable metal ions include but are not limited to zinc, copper, silver and combinations thereof. In one embodiment, it is preferred that at least 50% of the metal ions are zinc ions, e.g., at least 60%, at least 75%, at least 85% or at least 95%.

The metals ions are used in an effective amount to deactivate the virus. An effective amount as used herein referred to an amount of the metal ions that when incorporated with the hygroscopic polymer provides an antiviral activity to reduce, prevent growth or eliminate (collected referred to as deactivating) the virus exposed to the article. In one embodiment, an effective amount is enough not to cause clinical symptoms on tissue or to reduce transmission rates of the virus. The concentration of the metal ions may be greater than or equal to 200 wppm, e.g., greater than or equal to 250 wppm, greater than or equal to 300 wppm, greater than or equal to 350 wppm, greater than or equal to 400 wppm, or greater than or equal to 450 wppm. Lower amounts of metal ions tend to have limited efficacy to deactivate virus. Although higher amounts of metals ions may be used it is generally preferred to use an effective amount in fabric applications. Thus, the ranges of ions may be from 200 wppm to 1,000 wppm, including subranges therein, such as preferred ranges from 250 to 950 wppm, from 250 to 800 wppm or 300 to 550 wppm, or from 300 to 500 wppm. In some aspects, metal ions are embedded in the polymer.

The metal ions may be incorporated into the hygroscopic polymer during polymerization using suitable compounds, such as oxides, carbonates, stearates, pyrithiones, or adipates. This may achieve a wide distribution of the metal ions so that the textile produced by the filament yarns maintains its antiviral characteristics. In some embodiments, the metal ions are distributed evenly. Once incorporated, the compounds are readily ionized and remain in the ionized form. This provides a filament yarn where the concentration of the one or more metal ions exceeds the concentration of one or more metal compounds. Thus any loss due to retention is generally of the ions and not the metal compounds. In some embodiments, the one or more metal compounds incorporated in the hygroscopic polymer is less than 100 wppm, e.g., less than 50 wppm, less than 25 wppm, less than 10 wppm or less than 5 wppm.

In some embodiments, zinc ions ($Zn^{2+}$) are preferred metal ions. The zinc ions may be provided by one or more zinc oxide, zinc ammonium adipate, zinc acetate, zinc ammonium carbonate, zinc stearate, zinc phenyl phosphinic acid, or zinc pyrithione, or combinations thereof. In some aspects, the zinc is provided in the form of zinc oxide. In some aspects, the zinc is not provided via zinc phenyl phosphinate and/or zinc phenyl phosphonate. In some aspects, the zinc compound is ionized and the zinc ion is embedded in the polymer. The concentration of the zinc ions may be greater than or equal to 200 wppm, e.g., greater than or equal to 250 wppm, greater than or equal to 300 wppm, greater than or equal to 350 wppm, greater than or equal to 400 wppm, or greater than or equal to 450 wppm. Particularly suitable ranges of zinc ions may be from 200 wppm to 1,000 wppm, including subranges therein, such as preferred ranges from 250 to 950 wppm, from 250 to 800 wppm or 300 to 550 wppm, or from 300 to 500 wppm.

In some cases, the use of zinc provides for processing and or end use benefits. Other antiviral agents, e.g., copper or silver, may be used, but these often include adverse effects (e.g., on the relative viscosity of the polymer composition, toxicity, and health or environmental risk). In some situations, the zinc compound and zinc ion do not have adverse effects on the relative viscosity of the polymer composition. Also, the zinc does not present toxicity issues, unlike other antiviral agents, e.g., silver. The use of zinc in some application may provide for health advantages, such as immune system support. In addition, as noted herein, the use of zinc ions provides for the reduction or elimination of leaching into other media and/or into the environment. This both prevents the risks associated with introducing zinc into the environment and allows the polymer composition to be reused—zinc provides surprising "green" advantages over other types of antivirals, e.g., silver-containing, compositions.

As noted above, copper ions (provided via a copper compound) may be incorporated into the hygroscopic polymers. The copper ions may be used independently or in combination with zinc ions. In some cases, the copper compound may improve, e.g., enhance the antiviral properties of the polymer composition. In some cases, the copper compound may affect other characteristics of the polymer composition, e.g., antimicrobial activity or physical characteristics.

When used independently, the concentration of the copper ions may be greater than or equal to 200 wppm, e.g., greater than or equal to 250 wppm, greater than or equal to 300 wppm, greater than or equal to 350 wppm, greater than or equal to 400 wppm, or greater than or equal to 450 wppm. Particularly suitable ranges of copper ions may be from 200 wppm to 1,000 wppm, including subranges therein, such as preferred ranges from 250 to 950 wppm, from 250 to 800 wppm or 300 to 550 wppm, or from 300 to 500 wppm.

When copper ions are used as a promoter with zinc ions, the concentration of copper ions may be lower. In one embodiment, the molar ratio of the copper ions to the zinc ions is greater than 0.01:1, e.g., greater than 0.05:1, greater than 0.1:1, greater than 0.15:1, greater than 0.25:1, greater than 0.5:1, or greater than 0.75:1. In terms of ranges, the molar ratio of the copper ions to the zinc ions in the hygroscopic polymer may range from 0.01:1 to 15:1, e.g., from 0.05:1 to 10:1, from 0.1:1 to 9:1, from 0.15:1 to 8:1, from 0.25:1 to 7:1, from 0.5:1 to 6:1, from 0.75:1 to 5:1 from 0.5:1 to 4:1, or from 0.5:1 to 3:1. In terms of upper limits, the molar ratio of zinc ions to copper ions in the hygroscopic polymer may be less than 15:1, e.g., less than 10:1, less than 9:1, less than 8:1, less than 7:1, less than 6:1, less than 5:1, less than 4:1, or less than 3:1. In some cases, copper ion is bound to hygroscopic polymer along with zinc ion.

In some embodiments, copper ions as a promoter may be present in amounts greater than or equal to 5 wppm when used with zinc ions in an amount greater than or equal to 200 wppm. More preferably, copper ions as a promoter with zinc ions, may be present in amounts greater than or equal to 10 wppm, greater than or equal to 15 wppm, greater than or equal to 20 wppm, greater than or equal to 25 wppm, greater than or equal to 50 wppm, greater than or equal to 100 wppm. In one embodiment, the hygroscopic polymers comprises copper ions as a promoter in an amount ranging from 5 wppm to 800 wppm, e.g., from 10 wppm to 750 wppm, from 10 wppm to 600 wppm, from 10 wppm to 500 wppm, from 10 wppm to 400 wppm, from 10 wppm to 300 wppm, from 10 wppm to 250 wppm, from 10 wppm to 200 wppm, or from 10 wppm to 150 wppm.

The composition of the copper compound is not particularly limited. Suitable copper compounds include copper iodide, copper bromide, copper chloride, copper fluoride, copper oxide, copper stearate, copper ammonium adipate, copper acetate, or copper pyrithione, or combinations thereof. The copper compound may comprise copper oxide, copper ammonium adipate, copper acetate, copper ammonium carbonate, copper stearate, copper phenyl phosphinic acid, or copper pyrithione, or combinations thereof. In some embodiments, the copper compound comprises copper oxide, copper ammonium adipate, copper acetate, or copper pyrithione, or combinations thereof. In some embodiments, the copper compound comprises copper oxide, copper stearate, or copper ammonium adipate, or combinations thereof. In some aspects, the copper is provided in the form of copper oxide. In some aspects, the copper is not provided via copper phenyl phosphinate and/or copper phenyl phosphonate.

As noted above, silver ions (provided via a silver compound) may be incorporated into the hygroscopic polymers. The silver ions may be used independently or in combination with zinc ions and/or copper ions. In some cases, the silver compound may improve, e.g., enhance the antiviral properties of the polymer composition. In some cases, the silver compound may affect other characteristics of the polymer composition, e.g., antimicrobial activity or physical characteristics.

When used independently, the concentration of the silver ions may be greater than or equal to 200 wppm, e.g., greater than or equal to 250 wppm, greater than or equal to 300 wppm, greater than or equal to 350 wppm, greater than or equal to 400 wppm, or greater than or equal to 450 wppm. Particularly suitable ranges of silver ions may be from 200 wppm to 1,000 wppm, including subranges therein, such as preferred ranges from 250 to 950 wppm, from 250 to 800 wppm or 300 to 550 wppm, or from 300 to 500 wppm.

When silver ions are used as a promoter with zinc and/or copper ions, the concentration of silver ions may be lower. In one embodiment, the molar ratio of the silver ions to the zinc ions and/or copper ions is greater than 0.01:1, e.g., greater than 0.05:1, greater than 0.1:1, greater than 0.15:1, greater than 0.25:1, greater than 0.5:1, or greater than 0.75:1. In terms of ranges, the molar ratio of the silver ions to the zinc ions and/or copper ions in the hygroscopic polymer may range from 0.01:1 to 15:1, e.g., from 0.05:1 to 10:1, from 0.1:1 to 9:1, from 0.15:1 to 8:1, from 0.25:1 to 7:1, from 0.5:1 to 6:1, from 0.75:1 to 5:1 from 0.5:1 to 4:1, or from 0.5:1 to 3:1. In terms of upper limits, the molar ratio of zinc ions and/or copper ions to silver ions in the hygroscopic polymer may be less than 15:1, e.g., less than 10:1, less than 9:1, less than 8:1, less than 7:1, less than 6:1, less than 5:1, less than 4:1, or less than 3:1. In some cases, silver ion is bound to hygroscopic polymer along with zinc ion and/or copper ions.

In some embodiments, silver ions as a promoter may be present in amounts greater than or equal to 5 wppm when used with zinc ions in an amount greater than or equal to 200 wppm. More preferably, silver ions as a promoter with zinc ions, may be present in amounts greater than or equal to 10 wppm, greater than or equal to 15 wppm, greater than or equal to 20 wppm, greater than or equal to 25 wppm, greater than or equal to 50 wppm, greater than or equal to 100 wppm. In one embodiment, the hygroscopic polymers comprises silver ions as a promoter in an amount ranging from 5 wppm to 800 wppm, e.g., from 10 wppm to 750 wppm, from 10 wppm to 600 wppm, from 10 wppm to 500 wppm, from 10 wppm to 400 wppm, from 10 wppm to 300 wppm, from 10 wppm to 250 wppm, from 10 wppm to 200 wppm, or from 10 wppm to 150 wppm.

The composition of the silver compound is not particularly limited. Suitable silver compounds include silver iodide, silver bromide, silver chloride, silver fluoride, silver oxide, silver stearate, silver ammonium adipate, silver acetate, or silver pyrithione, or combinations thereof. The silver compound may comprise silver oxide, silver ammonium adipate, silver acetate, silver ammonium carbonate, silver stearate, silver phenyl phosphinic acid, or silver pyrithione, or combinations thereof. In some embodiments, the silver compound comprises silver oxide, silver ammonium adipate, silver acetate, or silver pyrithione, or combinations thereof. In some embodiments, the silver compound comprises silver oxide, silver stearate, or silver ammonium adipate, or combinations thereof. In some aspects, the silver is provided in the form of silver oxide. In some aspects, the silver is not provided via silver phenyl phosphinate and/or silver phenyl phosphonate.

The hygroscopic polymer may comprise phosphorus (in a phosphorus compound), e.g., phosphorus or a phosphorus compound is dispersed therein with the metal ions. In one embodiment, the polymer composition comprises phosphorus in an amount ranging from 50 wppm to 10000 wppm, e.g., from 50 wppm to 5000 wppm, from 50 wppm to 2500 wppm, from 50 wppm to 2000 wppm, from 50 wppm to 800 wppm, 100 wppm to 750 wppm, 100 wppm to 1800 wppm, from 100 wppm to 10000 wppm, from 100 wppm to 5000 wppm, from 100 wppm to 2500 wppm, from 100 wppm to 1000 wppm, from 100 wppm to 800 wppm, from 200 wppm to 10000 wppm, 200 wppm to 5000 wppm, from 200 wppm to 2500 wppm, from 200 ppm to 800 wppm, from 300 wppm to 10000 wppm, from 300 wppm to 5000 wppm, from 300 wppm to 2500 wppm, from 300 wppm to 500 wppm, from 500 wppm to 10000 wppm, from 500 wppm to 5000 wppm, or from 500 wppm to 2500 wppm. In terms of lower limits, the polymer composition may comprise greater than or equal to 50 wppm of phosphorus, e.g., greater than or equal to 75 wppm, greater than or equal to 100 wppm, greater than or equal to 150 wppm, greater than or equal to 200 wppm, greater than or equal to 300 wppm or greater than or equal to 500 wppm. In terms of upper limits, the polymer composition may comprise less than 10000 wppm (or 1 wt. %), e.g., less than 5000 wppm, less than 2500 wppm, less than 2000 wppm, less than 1800 wppm, less than 1500 wppm, less than 1000 wppm, less than 800 wppm, less than 750 wppm, less than 500 wppm, less than 475 wppm, less than 450 wppm, or less than 400 wppm. In some aspects, the phosphorus or the phosphorus compound is embedded in the polymer formed from the polymer composition.

The phosphorus optionally is present in or provided via a phosphorus compound, which may vary widely. The phosphorus compound may comprise benzene phosphinic acid, diphenylphosphinic acid, sodium phenylphosphinate, phosphorous acid, benzene phosphonic acid, calcium phenylphosphinate, potassium B-pentylphosphinate, methylphosphinic acid, manganese hypophosphite, sodium hypophosphite, monosodium phosphate, hypophosphorous acid, dimethylphosphinic acid, ethylphosphinic acid, diethylphosphinic acid, magnesium ethylphosphinate, triphenyl phosphite, diphenylmethyl phosphite, dimethylphenyl phosphite, ethyldiphenyl phosphite, phenylphosphonic acid, methylphosphonic acid, ethylphosphonic acid, potassium phenylphosphonate, sodium methylphosphonate, calcium ethylphosphonate, and combinations thereof. In some embodiments, the phosphorus compound comprises phosphoric acid, benzene phosphinic acid, or benzene phosphonic acid, or combinations thereof. In some embodiments, the phosphorus compound comprises benzene phosphinic acid, phosphorous acid, or manganese hypophosphite, or combinations thereof. In some aspects, the phosphorus compound may comprise benzene phosphinic acid.

In one embodiment, the molar ratio of the phosphorus to the zinc ions is greater than 0.01:1, e.g., greater than 0.05:1, greater than 0.1:1, greater than 0.15:1, greater than 0.25:1, greater than 0.5:1, or greater than 0.75:1. In terms of ranges, the molar ratio of the phosphorus to the zinc ions in the polymer composition may range from 0.01:1 to 15:1, e.g., from 0.05:1 to 10:1, from 0.1:1 to 9:1, from 0.15:1 to 8:1, from 0.25:1 to 7:1, from 0.5:1 to 6:1, from 0.75:1 to 5:1 from 0.5:1 to 4:1, or from 0.5:1 to 3:1. In terms of upper limits, the molar ratio of zinc ions to phosphorus in the polymer composition may be less than 15:1, e.g., less than 10:1, less than 9:1, less than 8:1, less than 7:1, less than 6:1, less than 5:1, less than 4:1, or less than 3:1. In some cases, phosphorus is bound in the polymer matrix along with zinc ions or other ions.

In one embodiment, the weight ratio of zinc ions to phosphorus in the polyamide composition may be greater than 1.3:1, e.g., greater than 1.4:1, greater than 1.5:1, greater than 1.6:1, greater than 1.7:1, greater than 1.8:1, or greater than 2:1. In terms of ranges, the weight ratio of zinc to phosphorus in the polyamide composition may range from 1.3:1 to 30:1, e.g., from 1.4:1 to 25:1, from 1.5:1 to 20:1, from 1.6:1 to 15:1, from 1.8:1 to 10:1, from 2:1 to 8:1, from 3:1 to 7:1, or from 4:1 to 6:1. In terms of upper limits, the weight ratio of zinc to phosphorus in the polyamide composition may be less than 30:1, e.g., less than 28:1, less than 26:1, less than 24:1, less than 22:1, less than 20:1, or less than 15:1. In some aspects, there is no phosphorus in the polyamide composition. In other aspects, a very low amount of phosphorus is present. In some cases, phosphorus is held in the polymer matrix along with zinc.

In one embodiment, the weight ratio of zinc to phosphorus in the polyamide composition may be less than 0.64:1, e.g., less than 0.62:1, less than 0.6:1, e.g., less than 0.5:1, less than 0.45:1, less than 0.4:1, less than 0.3:1, or less than 0.25:1. In terms of ranges, the weight ratio of zinc to phosphorus in the polyamide composition may range from 0.001:1 to 0.64:1, e.g., from 0.01:1 to 0.6:1, from 0.05:1 to 0.5:1, from 0.1:1 to 0.45:1, from 0.2:1 to 0.4:1, from 0.25:1 to 0.35:1, or from 0.2:1 to 0.3:1. In terms of lower limits, the weight ratio of zinc to phosphorus in the polyamide composition may be greater than 0.001:1, e.g., greater than 0.005:1, greater than 0.01:1, greater than 0.05:1, greater than 0.1:1, greater than 0.15:1, or greater than 0.2:1.

Advantageously, it has been discovered that adding the above identified zinc compounds and phosphorus compounds may result in a beneficial relative viscosity of the polymer composition. In some embodiments, the relative viscosity of the polymer composition ranges from 10 to 70, e.g., from 15 to 65, from 20 to 60, from 30 to 50, from 10 to 35, or from 15 to 32. In terms of lower limits, the relative viscosity of the polymer composition may be greater than or equal to 10, e.g., greater than or equal to 15, greater than or equal to 20, greater than or equal to 25, greater than or equal to 27.5, or greater than or equal to 30. In terms of upper limits, the relative viscosity of the polymer composition may be less than 70, e.g., less than 65, less than 60, less than 50, less than 40, or less than 35.

It has been determined that a specific amount of the zinc compound and the phosphorus compound can be mixed in a polymer composition, e.g., polyamide composition, in finely divided form, such as in the form of granules, flakes and the like, to provide a polymer composition that can be subsequently formed, e.g., extruded, molded or otherwise drawn, into various products (e.g., high-contact products, surface layers of high-contact products) by conventional methods to produce products having substantially improved antimicrobial activity. The zinc and phosphorus are employed in the polymer composition in the aforementioned amounts to provide a fiber with improved antimicrobial activity retention (near-permanent).

Zinc/Copper Retention Rate

As noted herein, by utilizing a polymer composition having the aforementioned metal ion, preferably zinc ions, and/or optional phosphorus compound in an effective amount, the resultant textile is capable of retaining a higher percentage of metal ions, even after dyeing. The resulting filament yarns and textiles are durable having near-permanent antiviral properties. The values associated with the retention rates discussed herein are also applicable to the individual metal ions.

In some embodiments, the antiviral fibers have a metal ions retention greater than or equal to 65% as measured by a dye bath test, e.g., greater than or equal to 75%, greater than or equal to 80%, greater than or equal to 90%, greater than or equal to 95%, greater than or equal to 97%, greater than or equal to 98%, greater than or equal to 99%, greater than or equal to 99.9%, greater than or equal to 99.99%, greater than or equal to 99.999%, greater than or equal to 99.9999%, greater than or equal to 99.99999% or greater than or equal to 99.999999%. In terms of upper limits, the antiviral fiber has a metal ions of less than 100%, e.g., less than 99.9%, less than 98%, or less than 95%. In terms of ranges, the antiviral fiber has a metal ions may be from 60% to 100%, e.g., from 60% to 99.999999%, from 60% to 99.99999%, from 60% to 99.9999%, from 60% to 99.999% from 60% to 99.999%, from 60% to 99.99%, from 60% to 99.9%, from 60% to 99%, from 60% to 98%, from 60% to 95%, from 65% to 99.999999%, from 65% to 99.99999%, from 65% to 99.9999%, from 65% to 99.999% from 65% to 99.999%, from 65% to 100%, from 65% to 99.99%, from 65% to 99.9%, from 65% to 99%, from 65% to 98%, from 65% to 95%, from 70% to 100%, from 70% to 99.999999%, from 70% to 99.99999%, from 70% to 99.9999%, from 70% to 99.999% from 70% to 99.999%, from 70% to 99.99%, from 70% to 99.9%, from 70% to 99%, from 70% to 98%, from 70% to 95%, from 75% to 100%, from 75% to 99.99%, from 75% to 99.9%, from 75% to 99.999999%, from 75% to 99.99999%, from 75% to 99.9999%, from 75% to 99.999% from 75% to 99.999%, from 75% to 99%, from 75% to 98%, from 75% to 95%, %, from 80% to 99.999999%, from 80% to 99.99999%, from 80% to 99.9999%, from 80% to 99.999% from 80% to 99.999%, from 80% to 100%, from 80% to 99.99%, from 80% to 99.9%, from 80% to 99%, from 80% to 98%, or from 80% to 95%. In some cases, the ranges and limits relate to dye recipes having lower pH values, e.g., less than (and/or including) 5.0, less than 4.7, less than 4.6, or less than 4.5. In some cases, the ranges and limits relate to dye recipes having higher pH values, e.g., greater than (and/or including) 4.0, greater than 4.2, greater than 4.5, greater than 4.7, greater than 5.0, or greater than 5.0.

In some embodiments, the antiviral fibers (or other antiviral products) formed from the polymer composition have a metal ions retention greater than or equal to 40% after a dye bath, e.g., greater than or equal to 44%, greater than or equal to 45%, greater than or equal to 50%, greater than or equal to 55%, greater than or equal to 60%, greater than or equal to 65%, greater than or equal to 70%, greater than or equal to 75%, greater than or equal to 80%, greater than or equal to 90%, greater than or equal to 95%, or greater than or equal to 99%. In terms of upper limits, the antiviral fibers may have a metal ions retention of less than 100%, e.g., less than 99.9%, less than 98%, less than 95% or less than 90%.

In terms of ranges, the antiviral fiber has a metal ions retention in a range from 40% to 100%, e.g., from 45% to 99.9%, from 50% to 99.9%, from 75% to 99.9%, from 80% to 99%, or from 90% to 98%. In some cases, the ranges and limits relate to dye recipes having higher pH values, e.g., greater than (and/or including) 4.0, greater than 4.2, greater than 4.5, greater than 4.7, greater than 5.0, or greater than 5.0.

In some embodiments, the antiviral fibers (or other antiviral products) formed from the polymer composition have a metal ions retention greater than or equal to 20%, e.g., greater than 24%, greater than or equal to 25%, greater than or equal to 30%, greater than or equal to 35%, greater than or equal to 40%, greater than or equal to 45%, greater than or equal to 50%, greater than or equal to 55%, or greater than or equal to 60%. In terms of upper limits, the antiviral fibers may have a metal ions of less than 80%, e.g., less than 77%, less than 75%, less than 70%, less than 68%, or less than 65%. In terms of ranges, the antiviral fibers may have a zinc and/or copper retention ranging from 20% to 80%, e.g., from 25% to 77%, from 30% to 75%, or from 35% to 70%. In some cases, the ranges and limits relate to dye recipes having lower pH values, e.g., less than (and/or including) 5.0, less than 4.7, less than 4.6, or less than 4.5.

In some embodiments, the antiviral fibers (or other antiviral products) formed from the polymer composition demonstrate an extraction rate of the metal ions less than 35% as measured by the dye bath test, e.g., less than 25%, less than 20%, less than 10%, or less than 5%. In terms of upper limits, the antiviral fiber demonstrates an extraction rate of the metal ions greater than or equal to 0%, e.g., greater than or equal to 0.1%, greater than or equal to 2% or greater than or equal to 5%. In terms of ranges, the antiviral fiber demonstrates an extraction rate of the metal ions from 0% to 35%, e.g., from 0% to 25%, from 0% to 20%, from 0% to 10%, from 0% to 5%, from 0.1% to 35%, from 0.1% to 25%, from 0.1% to 20%, from 0.2% to 10%, from 0.1% to 5%, from 2% to 35%, from 2% to 25%, from 2% to 20%, from 2% to 10%, from 2% to 5%, from 5% to 35%, from 5% to 25%, from 5% to 20%, or from 5% to 10%.

The metal ions of a fiber (or other product) formed from the polymer composition may be measured by a dye bath test according to the following standard procedure. A sample is cleaned (all oils are removed) by a scour process. The scour process may employ a heated bath, e.g., conducted at 71° C. for 15 minutes. A scouring solution comprising 0.25% on weight of fiber ("owf") of Sterox (723 Soap) nonionic surfactant and 0.25% owf of TSP (trisodium phosphate) may be used. The samples were then rinsed with water and then rinsed with cold water.

The cleaned samples may be tested according a chemical dye level procedure. This procedure may employ placing them in a dye bath comprising 1.0% owf of C.I. Acid Blue 45, 4.0% owf of MSP (monosodium phosphate), and a sufficient % owf of disodium phosphate or TSP to achieve a pH of 6.0, with a 28:1 liquor to fiber ratio. For example, if a pH of less than 6 is desired, a 10% solution of the desired acid may be added using an eye dropper until the desired pH was achieved. The dye bath may be preset to bring the bath to a boil at 100° C. The samples are placed in the bath for 1.5 hours. As one example, it may take approximately 30 minutes to reach boil and hold one hour after boil at this temperature. Then the samples are removed from the bath and rinsed. The samples are then transferred to a centrifuge for water extraction. After water extraction, the samples were laid out to air dry. The component amounts are then recorded.

In some embodiments, the metal ions of a fiber formed from the polymer composition may be calculated by measuring metal ions content before and after a dye bath operation. The amount of metal ions retained after the dye bath may be measured by known methods. For the dye bath, an Ahiba dyer (from Datacolor) may be employed. In a particular instance, twenty grams of un-dyed fabric and 200 ml of dye liquor may be placed in a stainless steel can, the pH may be adjusted to the desired level, the stainless steel can may be loaded into the dyer; the sample may be heated to 40° C. then heated to 100° C. (optionally at 1.5° C./minute). In some cases a temperature profile may be employed, for example, 1.5° C./minute to 60° C., 1° C./minute to 80° C., and 1.5° C./minute to 100° C. The sample may be held at 100° C. for 45 minutes, followed by cooling to 40° C. at 2° C./minute, then rinsed and dried to yield the dyed product.

In addition to the antimicrobial/antiviral (AM/AV) properties, the disclosed compositions surprisingly demonstrated improved zinc retention after washing (washfastness) of the polymer. The zinc retention may be characterized in relation to washes. The fiber and/or fabric is capable of retaining a higher percentage of zinc and/or copper, even after washing, as such the resulting yarns formed from the fibers have AM/AV properties.

In some embodiments, the AM/AV fibers formed from the polymer composition have a zinc and/or copper retention greater than or equal to 85% as measured in after 5 washes, e.g., greater than or equal to 90%, greater than or equal to 92%, greater than or equal to 95%, greater than or equal to 96%, greater than or equal to 98%, greater than or equal to 99%, or greater than or equal to 99.9%.

In some embodiments, the AM/AV fibers formed from the polymer composition have a zinc and/or copper retention greater than or equal to 65% as measured in after 10 washes, e.g., greater than or equal to 70%, greater than or equal to 72%, greater than or equal to 80%, greater than or equal to 85%, greater than or equal to 90%, greater than or equal to 95%, greater than or equal to 99%.

Antiviral Activity

The hygroscopic polymers have incorporated therein metal ions described herein exhibit antiviral properties, e.g., antiviral activity. Furthermore, the filament yarns and textile that are woven or knitted from the filament yarns, made of the hygroscopic polymers described herein exhibit antiviral properties. In particular, by utilizing a hygroscopic polymers having the aforementioned zinc, copper, silver and/or phosphorus compounds in an effective amount an article exhibiting antiviral properties can be prepared.

In some embodiments, the polymer compositions, and the products formed therefrom, exhibit durable antiviral characteristics that are permanent in nature, e.g., near permanent in nature. The durable antiviral properties last for a prolonged period of time, e.g., longer than one or more day, longer than one or more week, longer than one or more month, or longer than one or more years and allow the articles to be reused.

The antiviral properties may include any deactivating effect. In some embodiments, for example, the antiviral properties of the polymer composition include limiting, reducing, or inhibiting infection of a virus. In some embodiments, the antiviral properties of the polymer composition include limiting, reducing, or inhibiting pathogenesis of a virus. In some cases, the polymer composition may limit, reduce, or inhibit both infection and pathogenesis of a virus.

The virus affected by the antiviral properties of the polymer composition is not particularly limited. In some embodiments, for example, the virus is an adenovirus, a herpesvirus, an ebolavirus, a poxvirus, a rhinovirus, a coxsackievirus, an arterivirus, an enterovirus, a morbillivirus, a coronavirus, an influenza A virus, an avian influenza virus, a swine-origin influenza virus, or an equine influence virus. In some embodiments, the antiviral properties include limiting, reducing, or inhibiting the infection or pathogenesis of one of virus, e.g., a virus from the above list. In some embodiments, the antiviral properties include limiting, reducing, or inhibiting the infection or pathogenesis of multiple viruses, e.g., a combination of two or more viruses from the above list.

In some cases, the virus is a coronavirus, e.g., severe acute respiratory syndrome coronavirus (SARS-CoV), Middle East respiratory syndrome coronavirus (MERS-CoV), or severe acute respiratory syndrome coronavirus 2 (SARS-CoV-2) (e.g., the coronavirus that causes COVID-19). In some cases, the virus is structurally related to a coronavirus.

In some cases, the virus is an influenza virus, such as an influenza A virus, an influenza B virus, an influenza C virus, or an influenza D virus, or a structurally related virus. In some cases, the virus is identified by an influenza A virus subtype, e.g., H1N1, H1N2, H2N2, H2N3, H3N1, H3N2, H3N8, H5N1, H5N2, H5N3, H5N6, H5N8, H5N9, H6N1, H7N1, H7N4, H7N7, H7N9, H9N2, or H10N7.

In some cases, the virus is a the virus is a bacteriophage, such as a linear or circular single-stranded DNA virus (e.g., phi X 174 (sometimes referred to as ΦX174)), a linear or circular double-stranded DNA, a linear or circular single-stranded RNA, or a linear or circular double-stranded RNA. In some cases, the antiviral properties of the polymer composition may be measured by testing using a bacteriophage, e.g., phi X 174.

In some cases, the virus is an ebolavirus, e.g., Bundibugyo ebolavirus (BDBV), Reston ebolavirus (RESTV), Sudan ebolavirus (SUDV), nil Forest ebolavirus (TAFV), or Zaire ebolavirus (EBOV). In some cases, the virus is structurally related to an ebolavirus.

The antiviral activity is demonstrated through testing. General the deactivation is shown by the log reduction. To achieve antiviral efficacy of at least a 2-log reduction (99%) is desirable over a limited contact period.

The antiviral activity may be measured by a variety of conventional methods. For example, ISO18184:2019 may be utilized to assess the antiviral activity. In one embodiment, the polymer composition, e.g., a fiber, yarn, fabric, and/or nonwoven polymer structure formed from the polymer composition inhibits the pathogenesis (e.g., growth) of a virus in an amount ranging from 60% to 100% (complete kill), e.g., from 60% to 99.999999%, from 60% to 99.99999%, from 60% to 99.9999%, from 60% to 99.999% from 60% to 99.999%, from 60% to 99.99%, from 60% to 99.9%, from 60% to 99%, from 60% to 98%, from 60% to 95%, from 65% to 99.999999%, from 65% to 99.99999%, from 65% to 99.9999%, from 65% to 99.999% from 65% to 99.999%, from 65% to 100%, from 65% to 99.99%, from 65% to 99.9%, from 65% to 99%, from 65% to 98%, from 65% to 95%, from 70% to 100%, from 70% to 99.999999%, from 70% to 99.99999%, from 70% to 99.9999%, from 70% to 99.999% from 70% to 99.999%, from 70% to 99.99%, from 70% to 99.9%, from 70% to 99%, from 70% to 98%, from 70% to 95%, from 75% to 100%, from 75% to 99.99%, from 75% to 99.9%, from 75% to 99.999999%, from 75% to 99.99999%, from 75% to 99.9999%, from 75% to 99.999%, from 75% to 99%, from 75% to 98%, from 75% to 95%, from 80% to 99.999999%, from 80% to 99.99999%, from 80% to 99.9999%, from 80% to 99.999% from 80% to 99.999%, from 80% to 100%, from 80% to 99.99%, from 80% to 99.9%, from 80% to 99%, from 80% to 98%, from 80% to 95%, or from 90% to 99.999%, 99% to 99.999% or 99% to 99.9%. In terms of lower limits, a fiber formed from the polymer composition may inhibit (i.e. deactivate) greater than or equal to 60% of pathogenesis of the virus, e.g., greater than or equal to 65%, greater than or equal to 70%, greater than or equal to 75%, greater than or equal to 80%, greater than or equal to 85%, greater than or equal to 90%, greater than or equal to 95%, greater than or equal to 98%, greater than or equal to 99%, greater than or equal to 99.9%, greater than or equal to 99.99%, greater than or equal to 99.999%, greater than or equal to 99.9999%, greater than or equal to 99.99999%, or greater than or equal to 99.999999%.

In some cases, the efficacy may be measured in term of log reduction. For example, the composition/fibers/fabrics may demonstrate a virus log reduction greater than 1.0-log, as determined via ISO 18184 (2019), e.g., greater than 1.5-log, greater than 1.7-log, greater than 1.9-log, greater than 2.0-log, greater than 3.0-log, greater than 4.0-log, or greater than 5.0-log.

Self-Cleaning/Virus-Inactivating Fabrics

In some cases, the disclosure relates to self-cleaning and/or virus- or microbial-inactivating fabrics that may comprise the fabrics and compositions disclosed herein. In some embodiments, the fabrics are configured into masks or other personal protective equipment (PPE). Face masks and other PPE can reduce risk of spreading or getting infected with respiratory viruses, such as SARS-CoV-2, the causative agent of Covid-19. However, in some instances (where the microbial/virus is not inactivated), the viruses/microbes can remain infectious in or on the outside of conventional PPE for extended periods of time.

This disclosure relates to self-cleaning and/or virus- or microbial-inactivating fabrics that have the synergistic combination of the ability to trap the virus/microbe and the ability to inactivate or neutralize the virus/microbe. As such, the disclosed fabrics are able to capture and inactivate viruses/microbes before they reach the protected user. In contrast, hydrophobic polymers, such as polypropylene, are unable to effectively trap the microbial/virus for enough time for inactivation.

It has been discovered that respiratory viruses/microbes can be advantageously inactivated via absorption of droplet containing the viruses/microbes and inactivation thereof on the surface and within the bulk of the fabric. In some embodiments, the fabrics may be constructed from polymers that maintain a moisture balance, e.g., polyamides, and contain embedded zinc ions within their matrix to inactivate any respiratory viruses.

Additional Components

In some embodiments, the polymer composition may comprise additional additives for textile and fabric applications. The additives include pigments, hydrophilic or hydrophobic additives, anti-odor additives, additional antiviral agents, and antimicrobial/anti-fungal inorganic compounds, such as copper, zinc, tin, and silver.

In some embodiments, the polymer composition can be combined with color pigments for coloration for the use in fabrics or other components formed from the polymer composition. In some aspects, the polymer composition can be combined with UV additives to withstand fading and degradation in fabrics exposed to significant UV light. In some aspects, the polymer composition can be combined with additives to make the surface of the fiber hydrophilic or hydrophobic. In some aspects, the polymer composition can be combined with a hygroscopic material, e.g., to make the fiber, fabric, or other products formed therefrom more hygroscopic. In some aspects, the polymer composition can be combined with additives to make the fabric flame retardant or flame resistant. In some aspects, the polymer composition can be combined with additives to make the fabric stain resistant. In some aspects, the polymer composition can be combined with pigments with the antimicrobial compounds so that the need for conventional dyeing and disposal of dye materials is avoided.

In some embodiments, the polymer composition may further comprise additional additives. For example, the polymer composition may comprise a delusterant. A delusterant additive may improve the appearance and/or texture of the synthetic fibers and fabric produced from the polymer composition. In some embodiments, inorganic pigment-like materials can be utilized as delusterants. The delusterants may comprise one or more of titanium dioxide, barium sulfate, barium titanate, zinc titanate, magnesium titanate, calcium titanate, zinc oxide, zinc sulfide, lithopone, zirconium dioxide, calcium sulfate, barium sulfate, aluminum oxide, thorium oxide, magnesium oxide, silicon dioxide, talc, mica, and the like. In preferred embodiments, the delusterant comprises titanium dioxide. It has been found that the polymer compositions that include delusterants comprising titanium dioxide produce synthetic fibers and fabrics that greatly resemble natural fibers and fabrics, e.g., synthetic fibers and fabrics with improved appearance and/or texture. It is believed that titanium dioxide improves appearance and/or texture by interacting with the zinc compound, the phosphorus compound, and/or functional groups within the polymer.

In one embodiment, the polymer composition comprises the delusterant in an amount ranging from 0.0001 wt. % to 3 wt. %, e.g., 0.0001 wt. % to 2 wt. %, from 0.0001 to 1.75 wt. %, from 0.001 wt. % to 3 wt. %, from 0.001 wt. % to 2 wt. %, from 0.001 wt. % to 1.75 wt. %, from 0.002 wt. % to 3 wt 5, from 0.002 wt. % to 2 w %, from 0.002 wt. % to 1.75 wt. %, from 0.005 wt. % to 3 wt. %, from 0.005 wt. % to 2 wt. %, from 0.005 wt. % to 1.75 wt. %. In terms of upper limits, the polymer composition may comprise less than 3 wt. % delusterant, e.g., less than 2.5 wt. %, less than 2 wt. % or less than 1.75 wt. %. In terms of lower limits, the polymer composition may comprise greater than 0.0001 wt. % delusterant, e.g., greater than 0.001 wt. %, greater than 0.002 wt. %, or greater than 0.005 wt. %.

In some embodiments, the polymer compositions (and the products produced therefrom) advantageously comprise little or no content of processing aids such as surfactants and/or coupling agents (see discussion above). In some cases, the polymer compositions comprise less than 100 wppm surfactant and/or coupling agent, e.g., less than 50 wppm, less than less than 20 wppm, less than 10 wppm, or less than 5 wppm. In terms of ranges, the polymer compositions may comprise from 1 wppb to 100 wppm, e.g., from 1 wppb to 20 wppm, from 1 wppb to 10 wppm, or from 1 wppb to 5 wppm. The disclosed compositions may not employ any surfactant and/or coupling agent at all. There can be no surfactant and/or coupling agent present after processing, which is not the case for conventional formulations that do employ surfactant and/or coupling agents as necessary components. Even though some of these components may burn off during processing, some surfactant and/or coupling agent will remain in the resultant fibers.

Common surfactants include anionic surfactants, cationic surfactants and/or non-ionic surfactants. Specific examples are stearic acid, sodium dodecyl sulfonate surfactants, quaternary ammonium surfactants, amino acid surfactants, betaine surfactants, fatty acid glyceride ester surfactants, fatty acid sorbitan surfactants, lecithin surfactants, and/or Tween™ series surfactants (e.g., polyethoxylated sorbitan ester surfactants, nonionic polyoxyethylene surfactants, etc.).

In some embodiments, the polymer composition may further comprises colored materials, such as carbon black, copper phthalocyanine pigment, lead chromate, iron oxide, chromium oxide, and ultramarine blue.

In some embodiments, the polymer composition may include additional antiviral agents other than zinc. The additional antimicrobial agents may be any suitable antiviral. Conventional antiviral agents are known in the art and may be incorporated in the polymer composition as the additional antiviral agent or agents. For example, the additional antiviral agent may be an entry inhibitor, a reverse transcriptase inhibitor, a DNA polymerase inhibitor, an m-RNA synthesis inhibitor, a protease inhibitor, an integrase inhibitor, or an immunomodulator, or combinations thereof. In some aspects, the additional antimicrobial agent or agents are added to the polymer composition.

In some embodiments, the polymer composition may include additional antimicrobial agents other than zinc. The additional antimicrobial agents may be any suitable antimicrobial, such as silver, copper, and/or gold in metallic forms (e.g., particulates, alloys and oxides), salts (e.g., sulfates, nitrates, acetates, citrates, and chlorides) and/or in ionic forms. In some aspects, further additives, e.g., additional antimicrobial agents, are added to the polymer composition.

Exemplary Formulations

The polymer compositions described herein will be further understood by the following exemplary formulations and embodiments.

In one embodiment, the zinc compound comprises zinc oxide, zinc stearate, zinc pryithione, or zinc ammonium adipate, or combinations thereof, the phosphorus compound comprises benzene phosphinic acid, the molar ratio of the phosphorus to the zinc ranges from 0.01:1 to 3:1, the polymer composition has a relative viscosity of greater than 10, and fibers formed from the polymer composition demonstrate a retention rate of the zinc compound of greater than 85% when tested in a dye bath test.

In some embodiments, the antimicrobial agent, e.g., zinc, is added with the phosphorus compound to promote the incorporation of the antimicrobial agent into the polymer matrix of the polymer composition. This procedure advantageously allows for more uniform dispersion of the antimicrobial agent throughout the eventual fiber. Further, this combination "builds-in" the antimicrobial within the polymer composition to help prevent or limit the active antimicrobial ingredients from being washed from the fiber.

Fibers, Yarns, and Fabrics

In some cases, the hygroscopic polymers having an effective amount of metal ions incorporated therein may be used to prepare filament yarns. The polymer compositions impart durable antiviral properties to the resulting filament yarns that are permanent in nature and/or near-permanent in nature.

The average fiber diameter of the hygroscopic polymers may be a sufficient diameter to form a filament yarn. In some embodiments, the filament yarn are woven or knitted into textile that may be intended for use in next-to-skin applications, and the fibers have an average fiber diameter less than the diameter of fibers formed for carpet-related applications, which are generally unsuitable for next-to-skin applications. For example the fibers may have an average fiber diameter less than or equal to 20 microns, e.g., less than or equal to 18 microns, less than or equal to 17 microns, less than or equal to 15 microns, less than or equal to 14 microns, less than or equal to 13 microns, less than or equal to 12 microns. In one embodiment, at least 50% of the fibers have an average fiber diameter of greater than 10 microns, e.g., at least 50% of the fibers have an average fiber diameter of greater than 15 microns. The average fiber diameter may be greater than or equal to 1 micron, e.g., greater than 2 microns, greater than 3 microns, greater than 4 microns, greater than 5 microns, greater than 6 microns, greater than 7 microns, greater than 8 microns, greater than 9 microns, greater than 10 microns, greater than 11 microns, greater than 12 microns, or greater than 13 microns. In terms of ranges, the average fiber diameter may be from 1 to 20 microns, e.g., from 2 to 20 microns, from 5 to 20 microns, from 7 to 20 microns, from 8 to 20 microns, from 10 to 20 microns, 10 to less than 20 microns, from 10 to 19 microns, or from 10 to 18 microns. The distribution of fiber diameter is generally preferred to be such that 50% of the fibers are within the range from 10 to 20 microns. To the extent not indicated otherwise, test methods for determining average fiber diameters, may be by use of image analysis using optical microscopes which are well known in the art.

In some aspects, the polymer composition can be processed to form antimicrobial fibers having lower denier levels. As noted above, some carpet-related references have disclosed an antimicrobial nylon prepared in water with a zinc compound, a copper compound, and/or a phosphorus compound. These references, however disclose higher linear denier per filament levels (for example, greater than 12 dpf) and/or higher fiber diameter (for example, greater than 20 microns) fibers/filaments, e.g., carpet fibers and are not relevant to fibers/fabrics for next-to-skin end applications.

As used herein, "linear denier per filament" or "dpf" refers to the number of filaments per deiner. In some aspects, the filament yarn having the antiviral properties described herein has a linear denier per filament less than or equal to 12 dpf, e.g., less than or equal to 10 dpf, less than or equal to 8 dpf, less than or equal to 6 dpf, less than or equal to 5 dpf, less than or equal to 4 dpf, less than or equal to 3 dpf, less than or equal to 2 dpf, or less than or equal to 1.5 dpf. In terms of ranges, the filament yarn having the antiviral properties has a linear denier per filament in range from 1 dpf to 12 dpf, e.g., from 1 dpf to 10 dpf, from 1.1 dpf to 5 dpf, from 1.1 dpf to 3 dpf, from 1.1 dpf to 2 dpf, from 1.5 dpf to 3 dpf, from 1.5 dpf to 8 dpf, from 2 dpf to 6 dpf, or from 3 dpf to 5 dpf. In terms of lower limits, the antimicrobial fiber has a denier greater than 1 dpf, e.g., greater than 1.1 dpf, greater than 1.2 dpf, greater than 1.3 dpf, greater than 1.4 dpf, greater than 1.5 dpf, or greater than 2 dpf.

A textile article, such as a fabric, can be made from the filament yarn having the antiviral properties described herein by woven or knitting techniques. For example, fibers formed from the hygroscopic polymer composition may be spun to form a filament yarn. The filament yarn can then be used in knitting and/or weaving to provide textiles exhibiting the antiviral properties of the polymer composition. Garments made from these textiles can withstand normal wear, and is devoid of any coated, doped, or topical treatment, which tends to abrade off during knitting and weaving. The abrasion process results in dust on machines and fabric, and lowers the effective use time of garments in normal wear and laundering.

The textile of disclosed herein are preferably a lightweight or medium weight fabrics. In one embodiment, the basis weight of the textile is from greater than or equal to 15 gsm, e.g., or greater than or equal to 20 gsm, greater than or equal to 25 gsm, greater than or equal to 30 gsm, greater than or equal to 35 gsm, greater than or equal to 40 gsm, greater than or equal to 45 gsm, greater than or equal to 50 gsm, greater than or equal to 75 gsm, greater than or equal to 100 gsm, greater than or equal to 125 gsm, greater than or equal to 150 gsm, greater than or equal to 175 gsm. Heavier weight textiles are generally more durable and desired in some applications, and thus the upper range of the textile made of the filament yarns disclosed herein is less than or equal to 320 gsm, e.g., less than or equal to 300 gsm, less than or equal to 250 gsm, less than or equal to 200 gsm, less than or equal to 175 gsm, or less than or equal to 150 gsm. Suitable ranges of basis weight may include from 15 to 320 gsm, including subranges therein, such as preferred ranges from 15 to 300 gsm, e.g., from 30 to 220 gsm, from 35 to 200 gsm, or from 50 to 175 gsm.

The textile thickness may vary by application is generally limited by thickness that absorb excessive moisture and/or reduce air permeability. This allows a wide range from 0.05 cm to 5 cm thick textiles, e.g., from 0.5 to 3 cm, from 0.1 to 2 cm, from 0.1 to 1.5 cm.

Methods of Making Fibers

In some aspects, the fibers, e.g., polyamide fibers, are made by extruding a polymer formed in a melt polymerization process. During the melt polymerization process of the polymer composition, an aqueous monomer solution, e.g., salt solution, is heated under controlled conditions of temperature, time and pressure to evaporate water and effect polymerization of the monomers, resulting in a polymer melt. During the melt polymerization process, sufficient amounts of a zinc compound, a copper compound, and/or a phosphorus compound are employed in the aqueous monomer solution to form the polymer composition before polymerization. Additional components, such as delusterants, pigments, and additional antiviral agents, may also be employed in the aqueous monomer solution. After the metal compound, such as the preferred zinc compound and the copper compound, and/or the optional phosphorus compound are present in the aqueous monomer solution, the polymer composition may be polymerized. The polymerized polymer can subsequently be extruded into fibers. In some cases, the polymerized polymer can be extruded into other shapes, e.g., for use in preparing a high-contact product, as discussed below.

In some embodiments, the process for preparing an antiviral fiber (or other antiviral product) having near-permanent antiviral properties from the polymer composition includes preparing an aqueous monomer solution, adding a sufficient amount of metal compounds to achieve a ion concentration of least 200 wppm. The amount of metal compounds may be from 10 wppm to 20,000 wppm compound dispersed within the aqueous monomer solution, and optionally adding from 0.01 wt. % to 1 wt. % of phosphorus in a phosphorus compound, polymerizing the aqueous monomer solution to form a polymer melt, and extruding the polymer melt to form an antiviral fiber (or other antiviral product, e.g., a high-contact product and/or a surface layer of a high-contact product). In this embodiment, the polymer composition comprises the resultant aqueous monomer solution after metal (zinc) and optional phosphorus are added. In some aspects, the polymer melt can be extruded to form an antiviral fiber having a denier per filament as mentioned above.

In some embodiments, the process includes preparing an aqueous monomer solution. The aqueous monomer solution may comprise amide monomers. In some embodiments, the concentration of monomers in the aqueous monomer solution is less than 60 wt. %, e.g., less than 58 wt. %, less than 56.5 wt. %, less than 55 wt. %, less than 50 wt. %, less than 45 wt. %, less than 40 wt. %, less than 35 wt. %, or less than 30 wt. %. In some embodiments, the concentration of monomers in the aqueous monomer solution is greater than 20 wt. %, e.g., greater than 25 wt. %, greater than 30 wt. %, greater than 35 wt. %, greater than 40 wt. %, greater than 45 wt. %, greater than 50 wt. %, greater than 55 wt. %, or greater than 58 wt. %. In some embodiments, the concentration of monomers in the aqueous monomer solution is in a range from 20 wt. % to 60 wt. %, e.g., from 25 wt. % to 58 wt. %, from 30 wt. % to 56.5 wt. %, from 35 wt. % to 55 wt. %, from 40 wt. % to 50 wt. %, or from 45 wt. % to 55 wt. %. The balance of the aqueous monomer solution may comprise water and/or additional additives. In some embodiments, the monomers comprise amide monomers including a diacid and a diamine, i.e., nylon salt.

In some embodiments, the aqueous monomer solution is a salt solution. The salt solution may be formed by mixing a diamine and a diacid with water. For example, water, diamine, and dicarboxylic acid monomer are mixed to form a salt solution, e.g., mixing adipic acid and hexamethylene diamine with water. In some embodiments, the diacid may be a dicarboxylic acid and may be selected from the group consisting of oxalic acid, malonic acid, succinic acid, glutaric acid, pimelic acid, adipic acid, suberic acid, azelaic acid, sebacic acid, undecanedioic acid, dodecandioic acid, maleic acid, glutaconic acid, traumatic acid, and muconic acid, 1,2- or 1,3-cyclohexane dicarboxylic acids, 1,2- or 1,3-phenyl enediacetic acids, 1,2- or 1,3-cyclohexane diacetic acids, isophthalic acid, terephthalic acid, 4,4'-oxybisbenzoic acid, 4,4-benzophenone dicarboxylic acid, 2,6-napthalene dicarboxylic acid, p-t-butyl isophthalic acid and 2,5-furandicarboxylic acid, and mixtures thereof. In some embodiments, the diamine may be selected from the group consisting of ethanol diamine, trimethylene diamine, putrescine, cadaverine, hexamethyelene diamine, 2-methyl pentamethylene diamine, heptamethylene diamine, 2-methyl hexamethylene diamine, 3-methyl hexamethylene diamine, 2,2-dimethyl pentamethylene diamine, octamethylene diamine, 2,5-dimethyl hexamethylene diamine, nonamethylene diamine, 2,2,4- and 2,4,4-trimethyl hexamethylene diamines, decamethylene diamine, 5-methylnonane diamine, isophorone diamine, undecamethylene diamine, dodecamethylene diamine, 2,2,7,7-tetramethyl octamethylene diamine, bis(p-aminocyclohexyl)methane, bis(aminomethyl)norbornane, $C_2$-$C_{16}$ aliphatic diamine optionally substituted with one or more $C_1$ to $C_4$ alkyl groups, aliphatic polyether diamines and furanic diamines, such as 2,5-bis(aminomethyl)furan, and mixtures thereof. In preferred embodiments, the diacid is adipic acid and the diamine is hexamethylene diamine which are polymerized to form polyamide 6,6.

It should be understood that the concept of producing a polyamide from diamines and diacids also encompasses the concept of other suitable monomers, such as, aminoacids or lactams. Without limiting the scope, examples of aminoacids can include 6-aminohaxanoic acid, 7-aminoheptanoic acid, 11-aminoundecanoic acid, 12-aminododecanoic acid, or combinations thereof. Without limiting the scope of the disclosure, examples of lactams can include caprolactam, enantholactam, lauryllactam, or combinations thereof. Suitable feeds for the disclosed process can include mixtures of diamines, diacids, aminoacids and lactams.

Of course, as noted above, polyamides are only one type of polymer that may be utilized in the disclosed process. In addition, other polymerization reactants/reactions are contemplated.

After the aqueous monomer solution is prepared, a zinc compound, a copper compound, and/or a phosphorus compound are added to the aqueous monomer solution to form the polymer composition. In some embodiments, less than 20,000 ppm of zinc and/or less than 20,000 ppm of copper is dispersed within the aqueous monomer solution. In some aspects, further additives, e.g., additional antiviral agents, are added to the aqueous monomer solution.

In some cases, the polymer composition is polymerized using a conventional melt polymerization process. In one aspect, the aqueous monomer solution is heated under controlled conditions of time, temperature, and pressure to evaporate water, effect polymerization of the monomers and provide a polymer melt. In some aspects, the use of the zinc compound, the copper compound, and/or the phosphorus compound may advantageously improve the relative viscosity of the polymer composition, diminish the extraction rate of the zinc and/or copper compound during dyeing, and, and enhance its dyeability of the resultant antiviral fiber.

In some aspects, an antiviral polyamide is prepared by a conventional melt polymerization of a salt. Typically, the salt solution is heated under pressure (e.g. 250 psig/1825× $10^3$ n/m²) to a temperature of, for example, about 245° C. Then the water vapor is exhausted off by reducing the pressure to atmospheric pressure while increasing the temperature to, for example, about 270° C. Before polymerization, the metal compounds, preferably zinc and/or copper and, optionally, phosphorus, be added to the salt solution. The resulting molten polymer is held at this temperature for a period of time to bring it to equilibrium prior to being extruded and/or molded into a fiber or other product. In some aspects, the process may be carried out in a batch or continuous process.

In some embodiments, during melt polymerization, the zinc compound, e.g., zinc oxide, the copper compound, and/or the phosphorus compound, e.g., benezene phosphinic acid, are added to the aqueous monomer solution. The antiviral fiber (or other antiviral product) may comprise a polyamide that is made in a melt polymerization process and not in a master batch process. In some aspects, the resulting fiber has near-permanent antiviral properties.

The antiviral agent may be added to the polyamide during melt polymerization, and thereafter, the fiber (or other product) may be formed from extrusion and/or molding. Of course, other fiber forming methods are also contemplated. The formed fibers may be spun to form a resultant yarn to be used in knitting and/or weaving to provide the antiviral properties in the fabrics. While polyamide may be used to explain one aspect of the disclosure, it is understood that numerous polymers may be used herein without deviating from the present scope of the disclosure.

In some embodiments, the polymer composition is extruded in order to create a fiber. The extrusion process itself depends on the temperature of the mixture being sufficiently high to melt the mixture. A melting step may be a separate step or it may be part of either the mixing process or the extruding process. When the mixture is at a sufficiently high temperature, the mixture may be extruded using conventional mechanisms. The fiber may then be drawn, crimped, cut and spun into a yarn or other fabric depending on the intended end use. In some embodiments, the yarn is then dyed.

In some embodiments, the use of a multi-row die, as compared to a single row die, may be employed to produce the fibers/fabrics. The composition and characteristics of the polymer compositions, e.g., RV, allow the use of multi-row dies. As such, the processes for making the fibers/fabrics have additional process benefits as a result, e.g., an increased production rate, at least in part due to the properties of the polymer composition.

Plastics

In addition to the use of the hygroscopic polymers with an effective amount of metal ions, and optional phosphorous, in the use of woven and knitted fabrics made also be used in plastics, such as molded plastics. In one embodiment, when used in plastics the loading of metal ions, preferably zinc ions, may be greater than or equal to 200 wppm, e.g., greater than or equal to 300 wppm, greater than or equal to 400 wppm, greater than or equal to 500 wppm, greater than or equal to 600 wppm, greater than or equal to 700 wppm, greater than or equal to 800 wppm, greater than or equal to 900 wppm, greater than or equal to 1,000 wppm. In one embodiment, for plastic application the polymer composition may comprises metal ions, preferably zinc ions, in an amount ranging from 5 wppm to 100,000 wppm (10 wt %), e.g., 5 wppm to 20000 wppm, from 5 wppm to 17,500 wppm, from 5 wppm to 17,000 wppm, from 5 wppm to 16,500 wppm, from 5 wppm to 16,000 wppm, from 5 wppm to 15,500 wppm, from 5 wppm to 15,000 wppm, from 5 wppm to 12,500 wppm, from 5 wppm to 10,000 wppm, from 5 wppm to 5000 wppm, from 5 wppm to 4000 wppm, e.g., from 5 wppm to 3000 wppm, from 5 wppm to 2000 wppm, from 5 wppm to 1000 wppm, from 5 wppm to 500 wppm, from 10 wppm to 20,000 wppm, from 10 wppm to 17,500 wppm, from 10 wppm to 17,000 wppm, from 10 wppm to 16,500 wppm, from 10 wppm to 16,000 wppm, from 10 wppm to 15,500 wppm, from 10 wppm to 15,000 wppm, from 10 wppm to 12,500 wppm, from 10 wppm to 10,000 wppm, from 10 wppm to 5000 wppm, from 10 wppm to 4000 wppm, from 10 wppm to 3000 wppm, from 10 wppm to 2000 wppm, from 10 wppm to 1000 wppm, from 10 wppm to 500 wppm, from 50 wppm to 20,000 wppm, from 50 wppm to 17,500 wppm, from 50 wppm to 17,000 wppm, from 50 wppm to 16,500 wppm, from 50 wppm to 16,000 wppm, from 50 wppm to 15,500 wppm, from 50 wppm to 15,000 wppm, from 50 wppm to 12,500 wppm, from 50 wppm to 10,000 wppm, from 50 wppm to 5000 wppm, from 50 wppm to 4000 wppm, from 50 wppm to 3000 wppm, 50 wppm to 500 wppm, from 100 wppm to 20,000 wppm, from 100 wppm to 17,500 wppm, from 100 wppm to 17,000 wppm, from 100 wppm to 16,500 wppm, from 100 wppm to 16,000 wppm, from 100 wppm to 15,500 wppm, from 100 wppm to 15,000 wppm, from 100 wppm to 12,500 wppm, from 100 wppm to 10,000 wppm, from 100 wppm to 5000 wppm, from 100 wppm to 4000 wppm, from 100 wppm to 500 wppm, from 200 wppm to 20,000 wppm, from 200 wppm to 17,500 wppm, from 200 wppm to 17,000 wppm, from 200 wppm to 16,500 wppm, from 200 wppm to 16,000 wppm, from 200 wppm to 15,500 wppm, from 200 wppm to 15,000 wppm, from 200 wppm to 12,500 wppm, from 200 wppm to 10,000 wppm, from 200 wppm to 5000 wppm, from 200 wppm to 4000 wppm, 5000 wppm to 20000 wppm, from 200 wppm to 500 wppm, from 500 ppm to 10000 wppm, from 1000 ppm to 7000 wppm, or from 3000 ppm to 5000 wppm.

For plastic applications, in addition to the polymer, metal ions, and optional phosphorous, the polymer compositions may further comprise molding additives, which are generally not employed when preparing a polymer composition for spinning and blowing methods for fiber production.

The polyamide compositions for plastic applications disclosed herein include one or more impact modifiers. The inventors have found that these impact modifiers beneficially can be an elastomeric or rubbery material selected to have good interaction and compatibility with, and dispersion among, the one or more polyamide polymers of the composition. The impact modifier can include a styrenic copolymer such as an acrylate-butadiene-styrene or a methyl methacrylate-butadiene-styrene. The impact modifier can include an acrylic polymer or a polyethylene polymer such as a chlorinated polyethylene. In some embodiments, the impact modifier includes an ethylene-octene copolymer. In some cases, the combination of the impact modifier and the melt stabilizers (optionally in the disclosed amounts and ratios) provides for surprising, synergistic combinations of performance features, e.g., tensile/flexural performance and impact resistance.

In some cases, the impact modifier comprises olefins, acrylates, or acrylics, or combinations thereof, including polymers of these compounds such as polyolefins or polyacrylates. These compounds may be modified, e.g., modified (grafted) with maleic anhydride. In some embodiments, the impact modifier comprises a maleic anhydride-modified olefin, acrylate, or acrylic, or combinations thereof. In some cases, the impact modifier comprises a modified olefin, e.g., a maleic anhydride-modified olefin. The impact modifier may comprise a maleic anhydride-modified ethylene octene and/or ethylene acrylate.

In some embodiments, the impact modifier has a glass transition temperature ranging from ranging from 0° C. to −100° C., e.g., from −5° C. to −80° C., −10° C. to −70° C., −20° C. to −60° C., or from −25° C. to −55° C. In terms of lower limits, the impact modifier may have a glass transition temperature greater than −100° C., e.g., greater than −80° C., greater than −70° C., greater than −60° C., or greater than −55° C. In terms of upper limits, the impact modifier may have a glass transition temperature less than 0° C., e.g., less than −5° C., less than −10° C., less than −15° C., or less than −25° C. It is believed that impact modifiers having such glass transition temperatures synergistically improve energy dissipation characteristics, e.g., impact resistance. These particular impact modifiers have glass transition temperatures in temperature ranges that work with the disclosed polyamides and glass fibers to achieve improved impact performance, especially in the desired temperature ranges, e.g., −10° C. to −70° C.

The concentration of the impact modifier in the polyamide composition can, for example, range from 3 wt % to 30 wt %, e.g., from 2 wt % to 25 wt %, from 2 wt % to 20 wt %, from 5.7 wt % to 21.9 wt %, from 4.0 wt % to 15 wt %, from 5.5 wt % to 14 wt %, from 6.0 wt % to 11.5 wt %, from 8.4 wt % to 24.6 wt %, from 11.1 wt % to 27.3 wt %, or from 13.8 wt % to 30 wt %. In some embodiments, the concentration of the impact modifier ranges from 6 wt % to 20 wt %, e.g., from 6 wt % to 14.4 wt %, from 7.4 wt % to 15.8 wt %, from 8.8 wt % to 17.2 wt %, from 10.2 wt % to 18.6 wt %, or from 11.6 wt % to 20 wt %. In terms of upper limits, the impact modifier concentration can be less than 30 wt %, e.g., less than 27.3 wt %, less than 24.6 wt %, less than 21.9 wt %, less than 20 wt %, less than 18.6 wt %, less than 17.2 wt %, less than 15.8 wt %, less than 15 wt %, less than 14 wt %, less than 14.4 wt %, less than 13 wt %, less than 11.6 wt %, less than 11.5 wt %, less than 10.2 wt %, less than 8.8 wt %, less than 7.4 wt %, less than 6 wt %, or less than 5.4 wt %. In terms of lower limits, the impact modifier concentration can be greater than 3 wt %, greater than 4.0 wt %, greater than 5.5 wt %, greater than 5.4 wt %, greater than 6 wt %, greater than 7.4 wt %, greater than 8.8 wt %, greater than 10.2 wt %, greater than 11.6 wt %, greater than 13 wt %, greater than 14.4 wt %, greater than 15.8 wt %, greater than 17.2 wt %, greater than 18.6 wt %, greater than 20 wt %, greater than 21.9 wt %, greater than 24.6 wt %, or greater than 27.6 wt %. Lower concentrations, e.g., less than 3 wt %, and higher concentrations, e.g., greater than 30 wt %, are also contemplated.

The weight ratio of the one or more polyamide polymers to the impact modifier in the polyamide composition can, for example, range from 0.2 to 30, e.g., from 0.2 to 4, from 0.33 to 6.7, from 2 to 7, from 3 to 6, 1 to 15, from 5 to 15, from 2 to 12, from 0.54 to 11, from 0.9 to 18, or from 1.5 to 30. In terms of upper limits, the weight ratio of the one or more polyamide polymers to the impact modifier can be less than 30, e.g., less than 18, less than 15, less than 12, less than 11, less than 7, less than 6, less than 6.7, less than 4, less than 2.4, less than 1.5, less than 0.9, less than 0.54, or less than 0.33. In terms of lower limits, the weight ratio of the one or more polyamide polymers to the impact modifier can be greater than 0.2, e.g., greater than 0.33, greater than 0.55, greater than 0.9, greater than 1.5, greater than 2, greater than 2.4, greater than 3, greater than 5, greater than 6.7, greater than 11, or greater than 18. Lower ratios, e.g., less than 0.2, and higher ratios, e.g., greater than 30, are also contemplated.

The one or more heat stabilizers of the polyamide composition for plastic applications can be selected to improve performance, e.g., at higher operating temperatures, of the composition without significantly negatively affecting the strength or ductility of the material. The heat stabilizer can include, for example, hindered phenolic stabilizers, phosphite-based stabilizers, hindered amine-based stabilizers, triazine-based stabilizers, sulfur-based stabilizers, copper stabilizers, or combinations thereof.

Examples of hindered phenolic stabilizers include N,N'-hexane-1,6-diylbis[3-(3,5-ditert-butyl-4-hydroxyphenylpropionamide)]; pentaerythrityl-tetrakis[3-(3,5-di-tert-butyl-4-hydroxyphenyl)propionate]; N,N'-hexamethylene bis(3,5-di-tert-butyl-4-hydroxyhydrocinnamamide); triethyleneglycol-bis [3-(3-tert-butyl-5-methyl-4-hydroxyphenyl) propionate]; 3,9-bis{2-[3-(3-tert-butyl-4-hydroxy-5-methylphenyl)propionyloxy]-1,1-dimethylethyl}-2,4,8,10-tetraoxaspiro[5,5]undecane; 3,5-di-tert-butyl-4-hydroxybenzyl phosphonate-diethyl ester; 1,3,5-trimethyl-2,4,6-tris(3,5-ditert-butyl-4-hydroxybenzyl)benzene; and 1,3,5-tris(4-tert-butyl-3-hydroxy-2,6-dimethylbenzyl)isocyanurate.

Examples of phosphite-based stabilizers include trioctyl phosphite; trilauryl phosphite; tridecyl phosphite; octyldiphenyl phosphite; trisisodecyl phosphite; phenyl diisodecyl phosphite; phenyl di(tridecyl)phosphite; diphenyl isooctyl phosphite; diphenyl isodecyl phosphite; diphenyl(tridecyl) phosphite; triphenyl phosphite; tris(nonyl phenyl) phosphite; tris(2,4-di-tert-butyl phenyl) phosphite; tris(2,4-di-tert-butyl-5-methyl phenyl) phosphite; tris(butoxyethyl) phosphite; 4,4'-butylidene-bis(3-methyl-6-tertbutylphenyl-tetra-tridecyl)diphosphite; tetra($C_{12}$- to $C_{15}$-mixed alkyl)-4,4'-isopropylidenediphenyl diphosphite; 4,4'-isopropylidenebis(2-tert-butylphenyl)-di(nonylphenyl) phosphite; tris(biphenyl)phosphite; tetra(tridecyl)-1,1,3-tris(2-methyl-5-tertbutyl-4-hydroxyphenyl)butane diphosphite; tetra(tridecyl)-4,4'-butylidenebis(3-methyl-6-tert-butylphenyl)diphosphite; tetra($C_1$- to $C_{15}$-mixed alkyl)-4,4'-isopropylidenediphenyl diphosphite; tris(mono-/di-mixed nonylphenyl)phosphite; 4,4'-isopropylidenebis(2-tertbutylphenyl)-di(nonylphenyl)phosphite; 9,10-di-hydro-9-oxa-10-phosphorphenanthrene-10-oxide; tris(3,5-di-t-butyl-4-hydroxyphenyl)phosphite; hydrogenated-4,4'-isopropylidenediphenyl polyphosphite; bis(octylphenyl)-bis (4,4'-butylidenebis(3-methyl-6-tert-butyl phenyl)-1,6-hexanol diphosphite; hexa(tridecyl)-1,1,3-tris(2-methyl-4-hydroxy-5-tert-butylphenyl)butane triphosphite; tris(4,4'-isopropylidenebis(2-tertbutylphenyl) phosphite; tris(1,3-stearoyloxyisopropyl)phosphite; 2,2-methylenebis(4,6-ditert-butylphenyl)octyl phosphite; 2,2-methylenebis(3-methyl-4,6-di-tert-butylphenyl)-2-ethylhexyl phosphite; tetrakis(2,4-di-tert-butyl-5-methylphenyl)-4,4'-biphenylene diphosphite; and tetrakis(2,4-di-tert-butyl phenyl)-4,4'-biphenylene diphosphite.

Phosphite-based stabilizers also include pentaerythritol-type phosphite compounds, such as 2,6-di-tert-butyl-4-methylphenyl-phenyl-pentaerythritol diphosphite; 2,6-di-tert-butyl-4-methylphenyl-methyl-pentaerythritol diphosphite; 2,6-di-tert-butyl-4-methylphenyl-2-ethylhexyl-pentaerythritol diphosphite; 2,6-di-tert-butyl-4-methylphenylisodecyl-pentaerythritol diphosphite; 2,6-di-tert-butyl-4-methylphenyl-laurylpentaerythritol diphosphite; 2,6-di-tert-butyl-4-methylphenyl-isotridecyl-pentaerythritol diphosphite; 2,6-di-tert-butyl-4-methyl phenyl-stearyl-pentaerythritol diphosphite; 2,6-ditert-butyl-4-methyl phenyl-cyclohexyl-pentaerythritol diphosphite; 2,6-di-tert-butyl-4-methylphenyl-benzyl-pentaerythritol diphosphite; 2,6-di-tert-butyl-4-methylphenyl-ethylcellosolve-pentaerythritol diphosphite; 2,6-di-tert-butyl-4-methylphenyl-butylcarbitol-pentaerythritol diphosphite; 2,6-di-tert-butyl-4-methylphenyl-octylphenyl-pentaerythritol diphosphite; 2,6-di-tert-butyl-4-methylphenyl-nonylphenyl-pentaerythritol diphosphite; bis(2,6-di-tert-butyl-4-methyl phenyl)pentaerythritol diphosphite; bis(2,6-di-tert-butyl-4-ethylphenyl) pentaerythritol diphosphite; 2,6-di-tert-butyl-4-methylphenyl-2,6-di-tertbutylphenyl-pentaerythritol diphosphite; 2,6-di-tert-butyl-4-methylphenyl-2,4-di-tertbutylphenyl-pentaerythritol diphosphite; 2,6-di-tert-butyl-4-methylphenyl-2,4-di-tertoctylphenyl-pentaerythritol diphosphite; 2,6-di-tert-butyl-4-methylphenyl-2-cyclohexylphenyl-pentaerythritol diphosphite; 2,6-di-tert-amyl-4-methylphenyl-phenyl-pentaerythritol diphosphite; bis(2,6-di-tert-amyl-4-methylphenyl)pentaerythritol diphosphite; and bis(2,6-di-tert-octyl-4-methylphenyl)pentaerythritol diphosphite.

Examples of hindered amine-based stabilizers include 4-acetoxy-2,2,6,6-tetra methyl piperidine; 4-stearoyloxy-2,2,6,6-tetramethylpiperidine; 4-acryloyloxy-2,2,6,6-tetramethylpiperidine; 4-(phenylacetoxy)-2,2,6,6-tetramethylpiperidine; 4-benzoyloxy-2,2,6,6-tetramethylpiperidine; 4-methoxy-2,2,6,6-tetramethylpiperidine; 4-stearyloxy-2,2,6,6-tetramethylpiperidine; 4-cyclohexyloxy-2,2,6,6-tetra methylpiperidine; 4-benzyloxy-2,2,6,6-tetramethylpiperidine; 4-phenoxy-2,2,6,6-tetramethylpiperidine; 4-(ethylcarbamoyloxy)-2,2,6,6-tetramethylpiperidine; 4-(cyclohexylcarbamoyloxy)-2,2,6,6-tetramethylpiperidine; 4-(phenylcarbamoyloxy)-2,2,6,6-tetramethylpiperidine; bis (2,2,6,6-tetramethyl-4-piperidyl)-carbonate; bis(2,2,6,6-tetramethyl-4-piperidyl)-oxalate; bis(2,2,6,6-tetramethyl-4-piperidyl)-malonate; bis(2,2,6,6-tetramethyl-4-piperidyl)-sebacate; bis(2,2,6,6-tetramethyl-4-piperidyl)-adipate; bis (2,2,6,6-tetramethyl-4-piperidyl)terephthalate; 1,2-bis(2,2,6,6-tetramethyl-4-piperidyloxy)-ethane; α,α'-bis(2,2,6,6-tetramethyl-4-piperidyloxy)-p-xylene; bis(2,2,6,6-tetramethyl-4-piperidyl)-tolylene-2,4-dicarbamate; bis(2,2,6,6-tetra methyl-4-piperidyl)-hexamethylene-1,6- dicarbamate; tris(2,2,6,6-tetramethyl-4-piperidyl)-benzene-1,3,5-tricarboxylate; tris(2,2,6,6-tetramethyl-4-piperidyl)-benzene-1,3,4-tricarboxylate; 1-[2-{3-(3,5-di-tert-butyl-4-hydroxyphenyl)propionyloxy}butyl]-4-[3-(3,5-di-tert-butyl-4-hydroxyphenyl)propionyloxy]2,2,6,6-tetramethylpiperidine; and a condensation product of 1,2,3,4-butanetetracarboxylic acid; 1,2,2,6,6-pentamethyl-4-piperidinol; and β,β,β',β'-tetramethyl-3,9-[2,4,8,10-tetraoxaspiro(5,5)undecane]diethanol.

Examples of triazine-based stabilizers include 2,4,6-tris (2'-hydroxy-4'-octyloxy-phenyl)-1,3,5-triazine; 2-(2'-hydroxy-4'-hexyloxy-phenyl)-4,6-diphenyl-1,3,5-triazine; 2-(2'-hydroxy-4'-octyloxyphenyl)-4,6-bis(2',4-dimethylphenyl)-1,3,5-triazine; 2-(2',4'-dihydroxyphenyl)-4,6-bis(2',4'-dimethylphenyl)-1,3,5-triazine; 2,4-bis(2'-hydroxy-4'-propyloxy-phenyl)-6-(2',4'-dimethylphenyl)-1,3,5-triazine; 2-(2-hydroxy-4-octyloxyphenyl)-4,6-bis(4'-methylphenyl)-1,3,5-triazine; 2-(2'-hydroxy-4'-dodecyloxyphenyl)-4,6-bis(2',4'-dimethylphenyl)-1,3,5-triazine; 2,4,6-tris(2'-hydroxy-4'-isopropyloxyphenyl)-1,3,5-triazine; 2,4,6-tris(2'-hydroxy-4'-n-hexyloxyphenyl)-1,3,5-triazine; and 2,4,6-tris (2'-hydroxy-4'-ethoxycarbonylmethoxyphenyl)-1,3,5-triazine.

Copper stabilizers include copper halides, e.g., chlorides, bromides, iodides. Copper stabilizers also can include copper cyanide, copper oxide, copper sulfate, copper phosphate, copper acetate, copper propionate, copper benzoate, copper adipate, copper terephthalate, copper isophthalate, copper salicylate, copper nicotinate, copper stearate, and copper complex salts coordinated to a chelating amine such as ethylenediamine and ethylenediaminetetraacetic acid.

In some embodiments, the heat stabilizers comprise a copper-containing heat stabilizer. In some embodiments, the first copper-containing heat stabilizer comprises copper, a halogen, (or a copper halide—a compound containing copper and a halogen), and optionally an organohalo-phosphorus (organobromine-phosphorus) compound. In some aspects, the first copper-containing heat stabilizer comprises a mixture including copper halides, phosphates, or phosphines, or complexes thereof. In some aspects, the first copper-containing heat stabilizer comprises a complex including copper iodide, bis(triphenylphosphine), and tris (tribromoneopentyl)phosphate. Suitable first copper-containing heat stabilizers include those described in German Patent No. DE19847626, which is incorporated by reference in its entirety.

These copper halide and organohalo-phosphorus (organobromine-phosphorus) compound combinations, when added to the polyamides described herein, result in polyamide compositions that exhibit superior heat stability while also maintaining excellent electrical properties, thus making the polyamide compositions of the present invention ideally suited for use in the electrical/electronic industries. As a further benefit, this combination of a copper halide and an organophosphorus compound does not discolor the polyamide composition. Suitable commercial (first) copper-containing heat stabilizers include BRUGGOLEN® H3386 (available from Brüggemann Chemical).

In some embodiments, the polyamide composition for plastic applications includes a cerium-based heat stabilizer, e.g., cerium oxide, cerium hydrate, and/or cerium oxyhydrate.

The concentration of the heat stabilizer in the polyamide composition can, for example, range from 0.1 to 5 wt %, e.g., from 0.1 wt % to 1 wt %, from 0.15 wt % to 1.5 wt %, from 0.22 wt % to 2.3 wt %, from 0.1 wt % to 3 wt %, from 0.15 wt % to 1 wt %, from 0.32 wt % to 3.4 wt %, or from 0.48 wt % to 5 wt %. In some embodiments, the concentration of the heat stabilizer ranges from 0.2 wt % to 0.7 wt %. In terms of upper limits, the heat stabilizer concentration can be less than 5 wt %, e.g., less than 3.4 wt %, less than 3 wt %, less than 2.3 wt %. less than 1.5 wt %, less than 1 wt %, less than 0.71 wt %, less than 0.48 wt %, less than 0.32 wt %, less than 0.22 wt %, or less than 0.15 wt %. In terms of lower limits, the heat stabilizer concentration can be greater than 0.1 wt %, e.g., greater than 0.15 wt %, greater than 0.22 wt %, greater than 0.32 wt %, greater than 0.48 wt %, greater than 0.71 wt %, greater than 1 wt %, greater than 1.5 wt %, greater than 2.3 wt %, or greater than 3.4 wt %. Lower concentrations, e.g., less than 0.1 wt %, and higher concentrations, e.g., greater than 5 wt %, are also contemplated.

In some embodiments, the heat stabilizer comprises copper or a copper-containing compound such as, for example, copper iodide. After combining the heat stabilizer with the other polyamide composition components, the concentration of copper in the polyamide composition can, for example, range from 25 ppm to 700 ppm, e.g., from 25 ppm to 180 ppm, from 35 ppm to 260 ppm, from 49 ppm to 360 ppm, from 68 ppm to 500 ppm, or from 95 ppm to 700 ppm. In terms of upper limits, the concentration of copper in the polyamide composition can be less than 700 ppm, e.g., less than 500 ppm, less than 360 ppm, less than 260 ppm, less than 180 ppm, less than 130 ppm, less than 95 ppm, less than 68 ppm, less than 49 ppm, or less than 35 ppm. In terms of lower limits, the concentration of copper in the polyamide composition can be greater than 25 ppm, e.g., greater than 35 ppm, greater than 49 ppm, greater than 68 ppm, greater than 95 ppm, greater than 130 ppm, greater than 180 ppm, greater than 260 ppm, greater than 360 ppm, or greater than 500 ppm. Higher concentrations, e.g., greater than 700 ppm, and lower concentrations, e.g., less than 25 ppm, are also contemplated.

The weight ratio of the one or more polyamides to the heat stabilizer in the polyamide composition can, for example, range from 1 to 850, e.g., from 1 to 57, from 2 to 110, from 3.9 to 220, from 7.6 to 430, or from 15 to 850. In terms of upper limits, the weight ratio of the one or more polyamide polymers to the heat stabilizer can be less than 850, e.g., less than 430, less than 220, less than 110, less than 29, less than 57, less than 15, less than 7.6, less than 3.9, or less than 2. In terms of lower limits, the weight ratio of the one or more polyamide polymers to the heat stabilizer can be greater than 1, e.g., greater than 2, greater than 3.9, greater than 7.6, greater than 15, greater than 29, greater than 57, greater than 110, greater than 220, or greater than 430. Lower ratios, e.g., less than 1, and higher ratios, e.g., greater than 850, are also contemplated.

The weight ratio of the impact modifier to the heat stabilizer in the polyamide composition can, for example, range from 0.5 to 300, e.g., from 0.5 to 23, from 0.95 to 44, from 1.8 to 83, from 10 to 40 from 12 to 35, from 3.4 to 160, or from 6.5 to 300. In terms of upper limits, the weight ratio of the impact modifier to the heat stabilizer can be less than 300, e.g., less than 160, less than 83, less than 44, less than 40, less than 35, less than 23, less than 12, less than 6.5, less than 3.4, less than 1.8, or less than 0.95. In terms of lower limits, the weight ratio of the impact modifier to the heat stabilizer can be greater than 0.5, e.g., greater than 0.95, greater than 1.8, greater than 3.4, greater than 6.5, greater than 10, greater than 12, greater than 23, greater than 44, greater than 83, or greater than 160. Lower ratios. e.g., less than 0.5, and higher ratios, e.g., greater than 300, are also contemplated.

The polyamide composition for plastic applications can include one or more soluble dyes such as nigrosine or solvent black 7. The concentration of the nigrosine in the polyamide composition can, for example, range from 0.1 to 5 wt %, e.g., from 0.1 wt % to 1 wt %, from 0.15 wt % to 1.5 wt %, from 0.22 wt % to 2.3 wt %, from 0.32 wt % to 3.4 wt %, or from 0.48 wt % to 5 wt %. In some embodiments, the concentration of the nigrosine ranges from 1 wt % to 2 wt %, e.g., from 1 wt % to 1.6 wt %, from 1.1 wt % to 1.7 wt %, from 1.2 wt % to 1.8 wt %, from 1.3 wt % to 1.9 wt %, or from 1.4 wt % to 2 wt %. In terms of upper limits, the nigrosine concentration can be less than 5 wt %, e.g., less than 3.4 wt %, less than 2.3 wt %, less than 2 wt %, less than 1.9 wt %, less than 1.8 wt %, less than 1.7 wt %, less than 1.6 wt %, less than 1.5 wt %, less than 1.4 wt %, less than 1.3 wt %, less than 1.2 wt %, less than 1.1 wt %, less than 1 wt %, less than 0.71 wt %, less than 0.48 wt %, less than 0.32 wt %, less than 0.22 wt %, or less than 0.15 wt %. In terms of lower limits, the nigrosine concentration can be greater than 0.1 wt %, e.g., greater than 0.15 wt %, greater than 0.22 wt %, greater than 0.32 wt %, greater than 0.48 wt %, greater than 0.71 wt %, greater than 1 wt %, greater than 1.1 wt %, greater than 1.2 wt %, greater than 1.3 wt %, greater than 1.4 wt %, greater than 1.5 wt %, greater than 1.6 wt %, greater than 1.7 wt %, greater than 1.8 wt %, greater than 1.9 wt %, greater than 2 wt %, greater than 2.3 wt %, or greater than 3.4 wt %. Lower concentrations, e.g., less than 0.1 wt %, and higher concentrations, e.g., greater than 5 wt %, are also contemplated. In some cases, the nigrosine is provided in a masterbatch, and the concentration of the nigrosine in the masterbatch and in the resultant composition can be easily calculated.

The weight ratio of the one or more polyamide polymers to the nigrosine in the polyamide composition can, for example, range from 1 to 85, e.g., from 1 to 14, from 1.6 to 22, from 2.4 to 35, from 3.8 to 55, or from 5.9 to 85. In terms of upper limits, the ratio of the one or more polyamide polymers to the nigrosine can be less than 85, e.g., less than 55, less than 35, less than 22, less than 14, less than 9.2, less than 5.9, less than 3.8, less than 2.4, or less than 1.6. In terms of lower limits, the ratio of the one or more polyamide polymers to the nigrosine can be greater than 1, e.g., greater than 1.6, greater than 2.4, greater than 3.8, greater than 5.9, greater than 9.2, greater than 14, greater than 22, greater than 35, or greater than 55. Higher ratios, e.g., greater than 55, and lower ratios, e.g., less than 1, are also contemplated.

The weight ratio of glass fiber to the nigrosine in the polyamide composition can, for example, range from 2 to 60, e.g., from 2 to 15, from 2.8 to 22, from 3.9 to 30, from 5.5 to 43, or from 7.8 to 60. In terms of upper limits, the ratio of glass fiber to the nigrosine can be less than 60, e.g., less than 43, less than 30, less than 22, less than 15, less than 11, less than 7.8, less than 5.5, less than 3.9, or less than 2.8. In terms of lower limits, the ratio of glass fiber to the nigrosine can be greater than 2, e.g., greater than 2.8, greater than 3.9, greater than 5.5, greater than 7.8, greater than 11, greater than 15, greater than 22, greater than 30, or greater than 43. Higher ratios, e.g., greater than 60, and lower ratios, e.g., less than 2, are also contemplated.

The weight ratio of the heat stabilizer to the nigrosine in the polyamide composition can, for example, range from 0.02 to 5, e.g., from 0.02 to 0.55, from 0.035 to 0.95, from 0.06 to 1.7, from 0.1 to 2.9, or from 0.18 to 5. In terms of upper limits, the ratio of the heat stabilizer to the nigrosine can be less than 5, e.g., less than 2.9, less than 1.7, less than 0.95, less than 0.55, less than 0.32, less than 0.18, less than 0.1, less than 0.06, or less than 0.035. In terms of lower limits, the ratio of the heat stabilizer to the nigrosine can be greater than 0.02, e.g., greater than 0.035, greater than 0.06, greater than 0.1, greater than 0.18, greater than 0.32, greater than 0.55, greater than 0.95, greater than 1.7, or greater than 2.9. Higher ratios, e.g., greater than 5, and lower ratios, e.g., less than 0.02, are also contemplated.

The polyamide composition can include one or more pigments such as carbon black. The concentration of the carbon black in the polyamide composition can, for example, range from 0.1 to 5 wt %, e.g., from 0.1 wt % to 1.05 wt %, from 0.15 wt % to 1.55 wt %, from 0.22 wt % to 2.29 wt %, from 0.32 wt % to 3.38 wt %, or from 0.48 wt % to 5 wt %. In some embodiments, the concentration of the carbon black ranges from 0.2 wt % to 0.8 wt %. In terms of upper limits, the carbon black concentration can be less than 5 wt %, e.g., less than 3.4 wt %, less than 2.3 wt %. less than 1.5 wt %, less than 1 wt %, less than 0.71 wt %, less than 0.48 wt %, less than 0.32 wt %, less than 0.22 wt %, or less than 0.15 wt %. In some embodiments, the concentration of the carbon black is less than 3 wt %. In terms of lower limits, the carbon black concentration can be greater than 0.1 wt %, e.g., greater than 0.15 wt %, greater than 0.22 wt %, greater than 0.32 wt %, greater than 0.48 wt %, greater than 0.71 wt %, greater than 1 wt %, greater than 1.5 wt %, greater than 2.3 wt %, or greater than 3.4 wt %. Lower concentrations, e.g., less than 0.1 wt %, and higher concentrations, e.g., greater than 5 wt %, are also contemplated.

The polyamide composition for plastic applications can include one or more melt stabilizers (lubricants). The type and relative amount of melt stabilizer can be selected to improve processing of the composition, and to contribute to the simultaneously high strength and ductility of the material. The concentration of the melt stabilizer in the polyamide composition can, for example, range from 0.05 wt % to 5 wt %, e.g., from 0.05 wt % to 3 wt %, from 0.1 wt % to 0.6 wt %, from 0.2 wt % to 0.7 wt %, from 0.3 wt % to 0.8 wt %, from 0.1 wt % to 3 wt %, from 0.4 wt % to 0.9 wt %, from 0.5 wt % to 1 wt %, from 0.15 wt % to 1.5 wt %, from 0.22 wt % to 2.3 wt %, from 0.32 wt % to 3.4 wt %, or from 0.48 wt % to 5 wt %. In terms of upper limits, the melt stabilizer concentration can be less than 5 wt %, e.g., less than 3.4 wt %, less than 2.3 wt %. less than 1.5 wt %, less than 1 wt %, less than 0.9 wt %, less than 0.8 wt %, less than 0.7 wt %, less than 0.6 wt %, less than 0.5 wt %, less than 0.4 wt %, less than 0.3 wt %, less than 0.2 wt %, or less than 0.1 wt %. In terms of lower limits, the melt stabilizer concentration can be greater than 0.1 wt %, e.g., greater than 0.2 wt %, greater than 0.3 w %, greater than 0.4 wt %, greater than 0.5 wt %, greater than 0.6 wt %, greater than 0.7 wt %, greater than 0.8 wt %, greater than 0.9 wt %, greater than 1 wt %, greater than 1.5 wt %, greater than 2.3 wt %, or greater than 3.4 wt %. Lower concentrations, e.g., less than 0.1 wt %, and higher concentrations, e.g., greater than 5 wt %, are also contemplated.

In some embodiments, the melt stabilizer comprises a saturated fatty acid. For example the melt stabilizer may comprise stearic acid, or behenic acid, or combinations thereof, or salts thereof. In some cases, the melt stabilizer comprises a stearate. The melt stabilizer, in some cases can include, for example, calcium stearate, aluminum distearate, zinc stearate, calcium stearate, N,N' ethylene bis-stearamide, stearyl erucamide. In some cases, the melt stabilizer comprises stearic acid. In some cases the zinc stearate (or zinc borate (see below)) is not considered the zinc AM/AV compound.

In some embodiments, the melt stabilizer does not include an ionic lubricant. In addition to other performance improvements, the disclosed melt stabilizers, also significantly improve dispersion of the components in the matrix of the polymer, e.g., the dispersion of the impact modifiers in the polyamide matrix.

In some embodiments, the melt stabilizer may be a wax. In some embodiments, the melt stabilizer consists of a wax. In some embodiments, the wax includes a fatty acid. In some embodiments, the melt stabilizer consists of a fatty acid. In some embodiments, the wax includes a saturated fatty acid. In some embodiments, the melt stabilizer consists of a saturated fatty acid. In some embodiments, the wax includes stearic acid, behenic acid, or salts or combinations thereof. In some embodiments, the wax consists of stearic acid, behenic acid, or salts or combinations thereof.

In addition to other performance improvements, the disclosed melt stabilizers, also significantly improve dispersion of the components in the matrix of the polymer, e.g., the dispersion of the impact modifiers in the polyamide matrix, which beneficially improves impact performance.

The concentration of the melt stabilizer, e.g., stearic acid or salt thereof, in the polyamide composition can, for example, range from 0.03 wt % to 4 wt %, e.g., from 0.03 wt % to 0.57 wt %, from 0.05 wt % to 0.92 wt %, from 0.08 wt % to 1.5 wt %, from 0.13 wt % to 2.5 wt %, or from 0.21 wt % to 4 wt %. In terms of upper limits, the stearic acid or salt concentration can be less than 4 wt %, e.g., less than 2.4 wt %, less than 1.5 wt %, less than 0.92 wt %, less than 0.57 wt %, less than 0.35 wt %, less than 0.21 wt %, less than 0.13 wt %, less than 0.08 wt %, or less than 0.05 wt %. In terms of lower limits, the stearic acid or salt concentration can be greater than 0.03 wt %, e.g., greater than 0.05 wt %, greater than 0.08 wt %, greater than 0.13 wt %, greater than 0.21 wt %, greater than 0.35 wt %, greater than 0.57 wt %, greater than 0.92 wt %, greater than 1.5 wt %, or greater than 2.5 wt %. Higher concentrations, e.g., greater than 4 wt %, and lower concentrations, e.g., less than 0.03 wt %, are also contemplated.

The weight ratio of the impact modifier to the melt stabilizer in the polyamide composition can, for example, range from 1 to 100, e.g., from 2 to 50, from 5 to 50, from 10 to 40, from 10 to 35, from 5 to 25, from 10 to 20, from 10 to 50, from 20 to 40, or from 25 to 35. In terms of upper limits, the ratio of the impact modifier to the melt stabilizer can be less than 100, e.g., less than 75, less than 50, less than 40, less than 35, less than 25, or less than 20. In terms of lower limits, the ratio of the impact modifier to the melt stabilizer can be greater than 1, e.g., greater than 2, greater than 5, greater than 10, greater than 20, or greater than 25. Higher ratios are also contemplated.

As noted above, the combination of the impact modifier and the melt stabilizer leads to synergistic combinations of performance features. Generally, impact modifiers are known to have detrimental effects on tensile strength. For example a degradation in shear of the polymer is observed (shear is detrimentally increased and tensile performance is adversely affected). However, when the disclosed impact modifiers and melt stabilizers are used together, an unexpected balance is struck, the melt stabilizers reduce or eliminate the degradation. As a result, little or no loss in tensile performance is observed, while surprisingly impact resilience is significantly improved.

The flame retardant package for plastic applications may vary widely, and many suitable flame retardants are known. Examples of (bromine-containing) flame retardants include hexabromocyclododecane (HBCD), decabromodiphenyl oxide (DBDPO), octabromodiphenyl oxide, tetrabromobisphenol A (TBBA), bis(tribromophenoxy)ethane, bis(pentabromophenyl)ethane, tetrabromobisphenol A epoxy resin (TBBA epoxy), tetrabromobisphenol A carbonate (TBBA-PC), ethylene(bistetrabromophthal)imide (EBTBPI), ethylenebispentabromodiphenyl, tris(tribromophenoxy)triazine (TTBPTA), bis(dibromopropyl)tetrabromobisphenol A (DBP-TBBA), bis(dibromopropyl)tetrabromobisphenol S (DBP-TBBS), brominated polyphenylene ethers (BrPPE) (such as poly(di)bromophenylene ether, etc.), brominated polystyrenes (BrPPE) (such as polydibromostyrenes, polytribromostyrenes, crosslinked brominated polystyrenes, etc.), brominated crosslinked aromatic polymers, brominated epoxy resins, brominated phenoxy resins, brominated styrene-maleic anhydride polymers, tetrabromobisphenol S (TBBS), tris(tribromoneopentyl)phosphate (TTBNPP), polybromotrimethylphenylindan (PBPI), and tris(dibromopropyl)-isocyanurate (TDBPIC).

Halogen-based flame retardants may also be used. Conventional flame retardant synergists include, but are not limited to, antimony oxides (such as diantimony trioxide, diantimony tetroxide, diantimony pentoxide and sodium antimonate), tin oxides (such as tin monoxide and tin dioxide), iron oxides (such as iron(II) oxide and γ-iron oxide), zinc oxide and zinc borate. Generally, non-halogenated flame retardants are used due to a desire to avoid the potentially adverse environmental impact of halogenated flame retardants.

Exemplary non-halogenated flame retardants include phosphorus- or melamine-containing flame retardants. Melamine flame retardants are known in the art and include melamine phosphates and melamine cyanurate. Phosphate esters are especially suitable for use. Such compounds include, for example, alkyl and aryl esters of phosphoric acid such as trimethyl phosphate, triethyl phosphate, tributyl phosphate, trioctyl phosphate, tributoxyethyl phosphate, triphenyl phosphate, tricresyl phosphate, cresyldiphenyl phosphate, octyldiphenyl phosphate, tri(2-ethylhexyl) phosphate, di-iso-propylphenyl phosphate, trixylenyl phosphate, tris(iso-propylphenyl) phosphate, trinaphthyl phosphate, bisphenol A diphenyl phosphate, and resorcinol diphenyl phosphate. Commonly used triaryl phosphates include, for example, triphenyl phosphate (TPP), cresyl diphenyl phosphate, and tricresyl phosphate. Inorganic phosphate flame retardants such as ammonium polyphosphate (which acts as an intumescent flame retardant) may also be utilized.

Phosphinate flame retardants, including those sold under the Exolit® name, such as OP1230 and OP1400 may be used in the composition described herein. Phosphinate flame retardants may be desirable because of their anti-corrosive nature.

The concentration of the flame retardant in the polyamide composition can, for example, range from 3 wt % to 30 wt %, e.g., from 2 wt % to 25 wt %, from 2 wt % to 20 wt %, from 5.7 wt % to 21.9 wt %, from 4.0 wt % to 15 wt %, from 5.5 wt % to 14 wt %, from 6.0 wt % to 11.5 wt %, from 8.4 wt % to 24.6 wt %, from 11.1 wt % to 27.3 wt %, or from 13.8 wt % to 30 wt %. In some embodiments, the concentration of the flame retardant ranges from 6 wt % to 20 wt %, e.g., from 6 wt % to 14.4 wt %, from 7.4 wt % to 15.8 wt %, from 8.8 wt % to 17.2 wt %, from 10.2 wt % to 18.6 wt %, or from 11.6 wt % to 20 wt %. In terms of upper limits, the impact modifier concentration can be less than 30 wt %, e.g., less than 27.3 wt %, less than 24.6 wt %, less than 21.9 wt %, less than 20 wt %, less than 18.6 wt %, less than 17.2 wt %, less than 15.8 wt %, less than 15 wt %, less than 14 wt %, less than 14.4 wt %, less than 13 wt %, less than 11.6 wt %, less than 11.5 wt %, less than 10.2 wt %, less than 8.8 wt %, less than 7.4 wt %, less than 6 wt %, or less than 5.4 wt %. In terms of lower limits, the flame retardant concentration can be greater than 3 wt %, greater than 4.0 wt %, greater than 5.5 wt %, greater than 5.4 wt %, greater than 6 wt %, greater than 7.4 wt %, greater than 8.8 wt %, greater than 10.2 wt %, greater than 11.6 wt %, greater than 13 wt %, greater than 14.4 wt %, greater than 15.8 wt %, greater than 17.2 wt %, greater than 18.6 wt %, greater than 20 wt %, greater than 21.9 wt %, greater than 24.6 wt %, or greater than 27.6 wt %. Lower concentrations, e.g., less than 3 wt %, and higher concentrations, e.g., greater than 30 wt %, are also contemplated.

In cases where the flame retardant is a non-halogenated flame retardant, the non-halogenated flame retardant may be present in an amount of at least 5 wt. %, based on the total weight of the composition, e.g., at least 7.5 wt. %, at least 10 wt. %, or at least 12.5 wt. %. In terms of upper limits, the non-halogenated flame retardant is present in an amount of less than 25 wt. %, e.g., less than 22.5 wt. %, less than 20 wt. %, or less than 17.5 wt. %. In terms of ranges, the non-halogenated flame retardant is present from 5 to 25 wt. %, e.g., from 7.5 to 22.5 wt. %, from 10 to 20 wt. %, or from 12.5 to 17.5 wt. %.

The polyamide composition for plastic applications can also include one or more chain terminators, viscosity modifiers, plasticizers, e.g., diundecyl phthalate, UV stabilizers, catalysts, other polymers, delusterants, antimicrobial agents, antistatic agents, optical brighteners, extenders, processing aids, talc, mica, gypsum, wollastonite and other commonly used additives known to those of skill in the art. Additional suitable additives may be found in Plastics Additives, An A-Z reference, Edited by Geoffrey Pritchard (1998). The optional addition of a stabilizer to the additive dispersion is present in an exemplary embodiment. Stabilizers suitable for the additive dispersion include, but are not limited to, polyethoxylates (such as the polyethoxylated alkyl phenol Triton X-100), polypropoxylates, block copolymeric polyethers, long chain alcohols, polyalcohols, alkyl sulfates, alkyl-sulfonates, alkyl-benzenesulfonates, alkylphosphates, alkyl-phosphonates, alkyl-naphthalene sulfonates, carboxylic acids and perfluoronates.

In some embodiments, the stain resistance of the polyamide composition can be improved by salt-blending the polyamide precursor with a cationic dye modifier, such as 5-sulfoisophthalic acid or salts or other derivatives thereof.

Chain extenders can also be included in the polyamide composition. Suitable chain extender compounds include bis-N-acyl bislactam compounds, isophthaloyl bis-caprolactam (IBC), adipoyl bis-caprolactam (ABC), terphthaloyl bis-caprolactam (TBS), and mixtures thereof.

The polyamide composition for plastic applications can also include anti-block agents. Inorganic solids, usually in the form of diatomaceous earth, represent one class of materials that can be added to the disclosed polyamide composition. Non-limiting examples include calcium carbonate, silicon dioxide, magnesium silicate, sodium silicate, aluminum silicate, aluminum potassium silicate, and silicon dioxide are examples of suitable antiblock agents.

The polyamide compositions for plastic applications can also include a nucleating agent to further improve clarity and oxygen barrier as well as enhance oxygen barrier. Typically, these agents are insoluble, high melting point species that provide a surface for crystallite initiation. By incorporating a nucleating agent, more crystals are initiated, which are smaller in nature. More crystallites or higher % crystallinity correlates to more reinforcement/higher tensile strength and a more tortuous path for oxygen flux (increased barrier); smaller crystallites decreases light scattering which correlates to improved clarity. Non-limiting examples include calcium fluoride, calcium carbonate, talc and Nylon 2,2.

The polyamide compositions for plastic applications can also include organic anti-oxidants in the form of hindered phenols such as, but not limited to, Irganox 1010, Irganox 1076 and Irganox 1098; organic phosphites such as, but not limited to, Irgafos 168 and Ultranox 626; aromatic amines, metal salts from Groups IB, IIB, III, and IV of the periodic table and metal halides of alkali and alkaline earth metals.

The polyamide composition for plastic applications includes a reinforcing filler, e.g., glass fiber. The glass fiber can include soda lime silicate, zirconium silicates, calcium borosilicates, alumina-calcium borosilicates, calcium aluminosilicates, magnesium aluminosilicates, or combinations thereof. The glass fiber can include long fibers, e.g., greater than 6 mm, short fibers, e.g., less than 6 mm, or combinations thereof. The glass fiber can be milled.

The amount of glass fiber in the polyamide composition relative to the amounts of the other composition components can be selected to advantageously provide additional strength without negatively affecting material ductility. The concentration of glass fiber in the polyamide composition can, for example, range from 10 wt % to 60 wt %, e.g., from 10 wt % to 40 wt %, from 15 wt % to 45 wt %, from 20 wt % to 50 wt %, from 25 wt % to 55 wt %, or from 30 wt % to 60 wt %. In some embodiments, the concentration of glass fiber ranges from 25 wt % to 40 wt % e.g., from 25 wt % to 34 wt %, from 26.5 wt % to 35.5 wt %, from 28 wt % to 37 wt %, from 29.5 wt % to 38.5 wt %, or from 31 wt % to 40 wt %. In certain aspects, the concentration of glass fiber ranges from 30 wt % to 35 wt %. In terms of upper limits, the glass fiber concentration can be less than 60 wt %, e.g., less than 55 wt %, less than 50 wt %, less than 45 wt %, less than 40 wt %, less than 38.5 wt %, less than 37 wt %, less than 35.5 wt %, less than 34 wt %, less than 32.5 wt %, less than 31 wt %, less than 29.5 wt %, less than 28 wt %, less than 26.5 wt %, less than 25 wt %, less than 20 wt %, or less than 15 wt %. In terms of lower limits, the glass fiber concentration can be greater than 10 wt %, e.g., greater than 15 wt %, greater than 20 wt %, greater than 25 wt %, greater than 26.5 wt %, greater than 28 wt %, greater than 29.5 wt %, greater than 31 wt %, greater than 32.5 wt %, greater than 34 wt %, greater than 35.5 wt %, greater than 37 wt %, greater than 38.5 wt %, greater than 40 wt %, greater than 45 wt %, greater than 50 wt %, or greater than 55 wt %. Lower concentrations, e.g., less than 10 wt %, and higher concentrations, e.g., greater than 60 wt %, are also contemplated.

Additional details regarding formulations for molded products are disclosed in concurrently filed US non-provisional application Ser. No. 17/192,5133 entitled "Antimicrobial/Antiviral Plastics and molded Products", which is incorporated herein by reference.

Applications

The present disclosure related to various applications of the antiviral polymer compositions and the fibers, fabrics, and textiles formed therefrom. As described above, these products demonstrate permanent, e.g., near-permanent, antiviral properties. Thus, the polymer composition can be incorporated into any of a variety of products for which prolonged protection from viral infection and/or pathogenesis may be desirable.

In some aspects, a medical product or device may be prepared using the polymer compositions described herein. In some embodiments, for example, a medical product or device may be prepared from fibers, yarns, or fabrics formed from the polymer composition.

Because the fibers and/or textile exhibit durable antiviral properties that are permanent in nature or near-permanent in nature, the medical product or device may also exhibit permanent, e.g., near-permanent antiviral properties. Thus, in some cases, the medical product or device may be reusable.

Examples of medical products or devices that can be prepared using the polymer compositions include masks, wipes, gowns, towels, protective clothing, or protect nets.

For example, the polymer composition may be used in the preparation of a mask, e.g., a surgical mask, a procedure mask, a medical mask, and/or a dust mask, having antiviral properties. The antiviral properties of the mask may be particular useful in protecting against the transmission and/or infection of a virus, e.g., between and/or among healthcare workers or members of a larger population. The structure of the mask is not particularly limited, and any known structure may be used. Preferably, the mask is designed so as to ensure adequate protection (e.g., against transmission) while providing for wearer comfort and breathability. In some cases, the mask comprises a number of layers, e.g., one or more layers, two or more layers, or three or more layers. In some embodiments, one or more layers of the mask may be formed by a woven or knitted fabric according the present disclosure. In some aspects, the mask further comprises one or more layers of an antiviral fabric (as disclosed herein) in combination with one or more layers of another antiviral polymer layer that may be woven, knitted or nonwoven.

By way of another example, the polymer composition may be used in the preparation of a filter, e.g., an air filter, a HEPA filter, an automotive cabin air filter, or an aircraft air filter. The antiviral properties of the filter may be particular useful in protecting against the transmission and/or infection of a virus, e.g., by air flow units (such as HVAC). The structure of the filter is not particularly limited, and any known structure may be used. Preferably, the filter is designed so as to ensure adequate protection (e.g., against transmission) while providing for appropriate permeability. In some cases, the filter comprises a number of layers, e.g., one or more layers, two or more layers, or three or more layers. In some embodiments, one or more layers of the filter may be formed by an woven or knitted fabric according the present disclosure.

By way a more general example, the polymer composition may be used in the preparation of a layered structure, which may have any of a variety of uses. The layered structure may comprise, for example, an antiviral layer comprising a described polymer composition as well as an additional layer. The incorporation of the polymer composition into the layered structure provides the layered structure with antiviral properties, such as limiting, reducing, or inhibiting infection and/or pathogenesis of a virus. In some cases, the layered structure may include an additional antiviral agent, optionally comprising an entry inhibitor, a reverse transcriptase inhibitor, a DNA polymerase inhibitor, an m-RNA synthesis inhibitor, a protease inhibitor, an integrase inhibitor, or an immunomodulator, or combinations thereof. In some cases, the layer structure includes a fabric of nanofibers produced from the polymer composition. In some cases, the layer structure includes a woven or knitted polymer structure produced from the polymer composition.

Those skilled in the art will appreciate that fibers, yarns, fabrics, and textile polymer structures exhibiting antiviral properties may be desirably incorporated into other products, such as textiles, for any of a variety of uses.

High-Contact Products

The polymer composition may be used in the preparation of a high-contact product. A high-contact product may be any product that is handled (e.g., touched) by a user or otherwise comes into contact with the user during conventional use. The polymer compositions may be utilized for high-contact products used in any setting.

In some embodiments, a disclosed polymer composition alone is used to prepare a high-contact product. Said another way, a high-contact product may be entirely composed of a polymer composition. In some embodiments, a disclosed polymer composition is a component of the high contact product. For example, the polymer composition may form a layer (e.g., a surface coating) on the high-contact product.

As discussed above, the polymer compositions described herein demonstrate antiviral properties, and these properties may be surprisingly enhanced by certain characteristics of the polymer composition. For example, the use of a hydrophilic and/or hygroscopic polymer improves (e.g., increases) the antiviral activity of the polymer composition. Thus, the polymer compositions may be especially useful for high-contact products that come into contact with moisture during typical use. For example, the polymer compositions may be especially useful for masks (e.g., medical masks) and air filters (e.g., HVAC filters, automobile filters, aviation filters)

Methods of making the high-contact product are not particularly limited, and conventional methods may be used. In some embodiments, for example, a hot melt polymerization (e.g., as discussed above with respect to fibers) may be used to prepare the polymer composition, which may then be extruded and/or formed into the high-contact product.

The following examples are illustrative and should not be read as limiting the definition of a high-contact product.

In some cases, the high-contact product may be a piece or portion of furniture, e.g., for use in an academic, business, or medical setting. For example, the polymer composition may be used in the preparation of a chair (e.g., as a part or all of a chair base, a chair handle, a chair seatback, or a chair leg), a table (e.g., as a part or all of a tabletop or a table leg), a desk (e.g., as a part or all of a desktop or a desk leg), shelving, or a bed (e.g., as a part or all of a bedframe, a bed railing, a bed leg, a headboard, or a footboard).

In some cases, the high-contact product may be a piece or portion of a consumer product, e.g., consumer electronics. For example, the polymer composition may be used in the preparation of a housing or case for a cellular phone, a component of computer (e.g., a housing, a display, a keyboard, or a mouse of a desktop computer or a laptop computer), a component of a kitchen or culinary item (e.g., a refrigerator, oven, stove, range, microwave oven, cookware, or cooking utensil), or a component of a personal hygiene product (e.g., a toothbrush, hair brush, comb, toilet seat, toilet seat cover, razor, or an air filter).

In some cases, the high-contact product may be a piece or portion of medical equipment. For example, the polymer composition may be used in the preparation of monitor equipment (e.g., a blood pressure monitor or an ultrasound probe), radiology equipment (e.g., a portion of an MRI machine or a CT machine), a ventilator, or a patient transfer sheet.

In some cases, the high-contact product may be a piece or portion of a textile product. For example, the polymer composition may be used in the preparation of clothing, a medical gown, a medical mask, a medical drape, a patient transfer slip sheet, curtains, bedding (e.g., bedsheets, a duvet, a duvet cover, a pillow, or a pillow cover), or luggage (e.g., a suitcase or a garment bag), shoes (e.g., a shoe upper, a shoe lining, or sewing thread for a shoe).

In some cases, the high-contact product may be a molded article. For example, the polymer composition may be used in the preparation of packaging (e.g., disposable or reusable food and/or liquid packaging), automotive parts or components, mechanical parts, toys, musical instruments, furniture, or storage containers.

As noted above, the polymer of the polymer composition are capable of absorbing moisture, and generally referred to as being hydrophilic and/or hygroscopic. This may be particularly beneficial for certain high-contact products, which may be exposed to moisture during operation. Moisture (e.g., moisture present on the skin, in sweat, or in saliva) typically facilitates viral transmission, and a hydrophilic and/or hygroscopic polymer composition may draw in virus-containing moisture. In particular, the moisture may be attracted to the composition (e.g., on a surface of the high-contact product), and the composition may then kill a virus contained therein. Thus, the disclosed polymer compositions may be used in forming (in whole or in part) high-contact products that greatly reduce transmission of a virus.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims or the equivalents thereof.

EXAMPLES

Example 1—Hygroscopic Polymer Absorption of Viruses

This experiment demonstrates that hygroscopic polymers retain virus and the virus is not trapped on the surface. A knitted polyamide 66 (PA66) textile having a basis weight of 186 gsm was used a hygroscopic polymer. The moisture absorption was greater than 0.3% based on the weight of the polymer. For purposes of this example the metal ions and/or compounds were not loaded and the cytotoxicity was not measured.

Moreover, the strong absorbing properties of cotton may constitute a potential health hazard if cotton face masks are not washed or disposed of properly.

IAV strain A/WSN/33 (H1N1) was added to a textile PA66 fabric. After a 30-min incubation at room temperature, the fabric was washed with PBS to remove unabsorbed virus and all liquid removed. To estimate the amount of remaining liquid, the sample tube with fabric was weighed and compared to its dry weight.

A similar test was repeated for International Antimicrobial Council (IAC) issued cotton fabric, and polypropylene (PPP) fabric from a disposable type II 3-ply face mask. Cotton is hydrophilic by has significant moisture absorption of up to 500%, while polypropylene is hydrophobic.

Figure 1B:
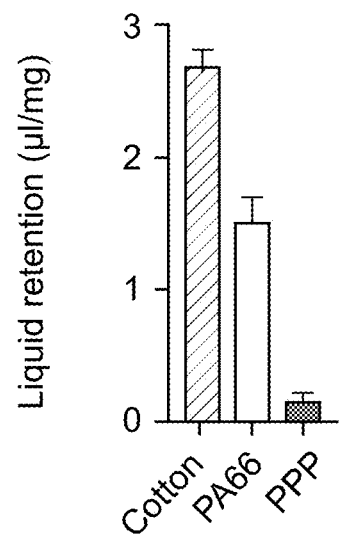
FIG. 1B is graph showing the liquid retention on a dry weight basis for fabrics described in Example 1.
Figure 1C:
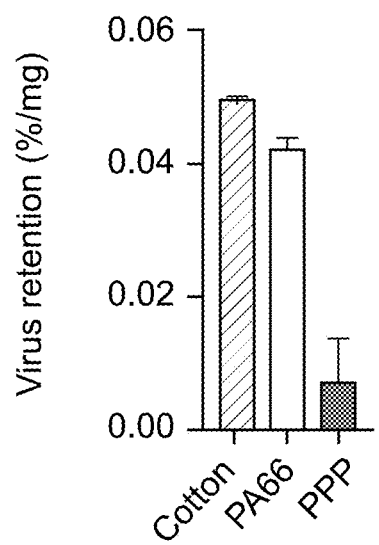
FIG. 1C is graph showing the virus retention for fabrics described in Example 1.

The PA66 fabric retained significantly more liquid than polypropylene, both relative to the applied volume and weight of the fabric, as shown in FIG. 1A, and the normalized dry weight, as shown in FIG. 1B. Subsequent analysis of the IAV titer in the input and fabric washes showed that the cotton and PA66 fabrics readily absorbed the applied virus, respectively, while less virus was observed by the polypropylene fabric as shown in FIG. 1C. As noted herein, this ability to absorb of the virus beneficially contributes to the AM/AV properties of the fibers/fabrics. Detrimentally, the exceedingly strong absorbing properties of cotton may constitute a potential health hazard if cotton face masks are not washed or disposed of properly.

In order to remove H1N1 from the cotton and PA66 fabrics without inactivating the virus, different concentrations of polysorbate-80 (tween-80)—a mild detergent that is also used in IAV vaccine preparations—were added to the PBS wash buffer. It was found that 0.05% tween-80 succeeded in recovering more than 94% of the virus from the PA66 fabric, whereas 61% was removed from the cotton fabric. No cytopathic effects of the detergent on the MDCK cells used for the plaque assay were observed, but the presence of 0.05%-0.1% tween-80 increased the apparent viral titer relative to infections in PBS (see FIG. 1D and FIG. 1E), whereas 0.25-0.5% tween-80 reduced IAV WSN plaque size, and 1% tween-80 prevented viral infection entirely.

To confirm whether other viruses could be removed from PA66 fabric, the experiment was repeated with SARS-CoV-2 for each of the materials. It was found that over 92% of SARS-CoV-2 can be recovered from the woven PA66 fabric using 0.05% tween-80, while up to 59% could be recovered from the cotton fabric.

Together, these results demonstrate that IAV and SARS-CoV-2 are strongly absorbed by the PA66 fabric, suggesting that these materials would trap respiratory viruses inside the textile, which in turn provides for unexpectedly improved AM/AV performance. At the same time, these findings demonstrate that polypropylene, with its low hygroscopy, is poor at trapping respiratory viruses. Since IAV and SARS-CoV-2 can be removed from a PA66 fabric with a mild detergent, this protocol can be useful for testing the inactivating properties of other hygroscopic fabrics.

It was found that the addition of tween-80 results in efficient virus release from PA66, but not as much from cotton. Virus retention on polypropylene, which is used for the construction of disposable 3-ply masks, is poor, in line with its hydrophobic properties. This result implies that respiratory viruses remain on the surface of polypropylene materials. Together with findings that SARS-CoV-2 can survive on various surfaces for several hours to days, and even 7 days on polypropylene-based surgical face masks, this implies that non-absorbent fabrics, such as polypropylene 3-ply masks, may present potential health hazards.

TABLE 1

Polymer Absorption of Viruses

Figures 1D, 1E:
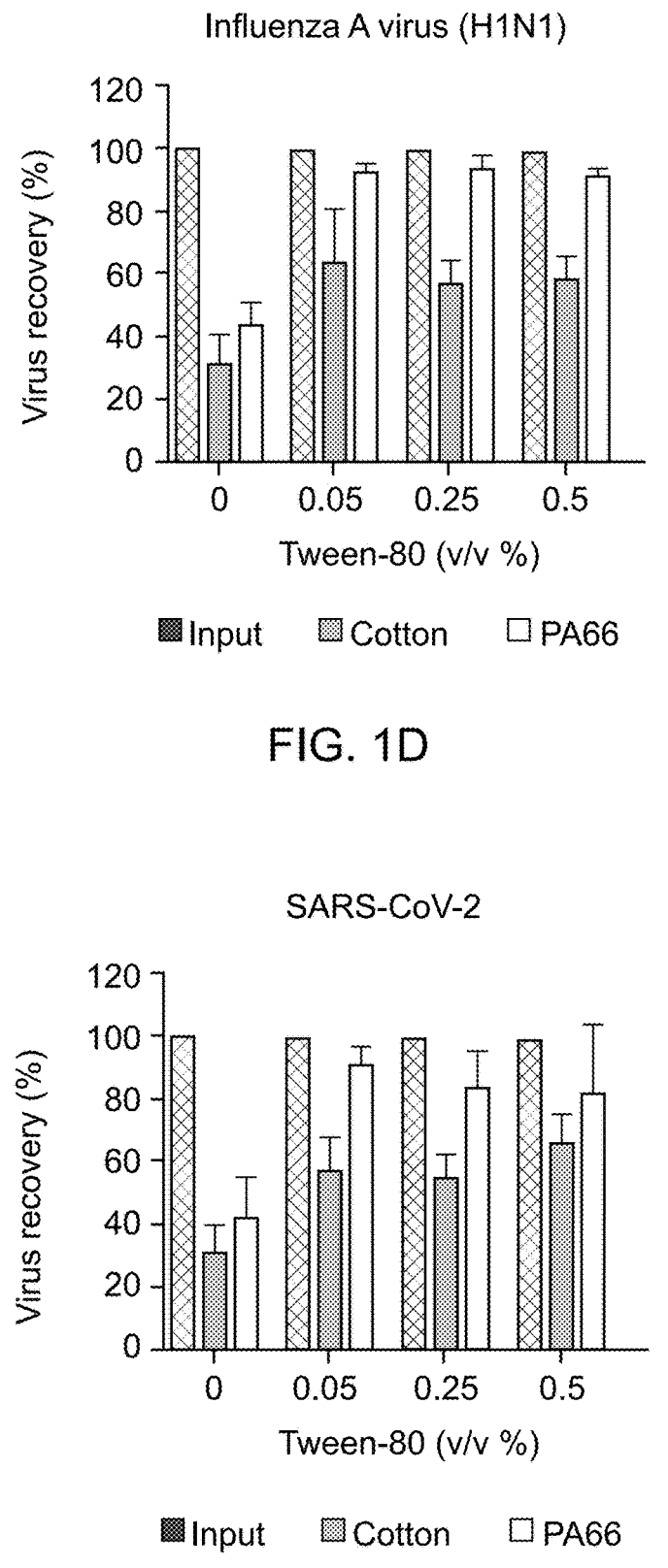

| | PA 66 Fabric | Cotton | Polypropylene |
|---|---|---|---|
| Moisture absorption | Hygroscopic | Hydrophilic/Hygroscopic | Hydrophobic |
| Liquid retention (µl/µl) FIG. 1A | 1.9 | 4.1 | 0.01 |
| Liquid retention (dry basis) FIG. 1B (µl/mg) | 1.75 | 2.8 | 0.1 |
| Virus retention (H1N1) (%/mg) FIG. 1C | 0.04 | 0.05 | 0.005 |
| Virus recovery @ 0.05 Tween-80 (H1N1) (%) FIG. 1D | 94% | 61% | <0.01 |
| Virus recovery @ 0.05 Tween-80 (SARS-CoV-2) (%) FIG. 1E | 92% | 59% | <0.01 |

Example 2—Virus Inactivation

Copper and zinc surfaces or particles have been found to inactivate IAV strains and seasonal CoV HCoV 229E. Other polymers, such as polypropylene imbued with copper oxide can potentially inactive IAV. However, in this example, it was demonstrated that embedding zinc into polymers has additional unexpected benefits versus copper. For example, zinc has a much higher propensity to ionize than copper, and thereby provides a much faster reaction potential. Moreover, zinc oxide, which was embedded in the PA66 polymer used in this example, is considered a Generally Regarded As Safe (GRAS) compound by the FDA, which can advantageously speed up the development and regulation process. Finally, zinc has been found to not cause discoloration of the polymer or fabric, which enables much broader applicability.

Figure 2A:
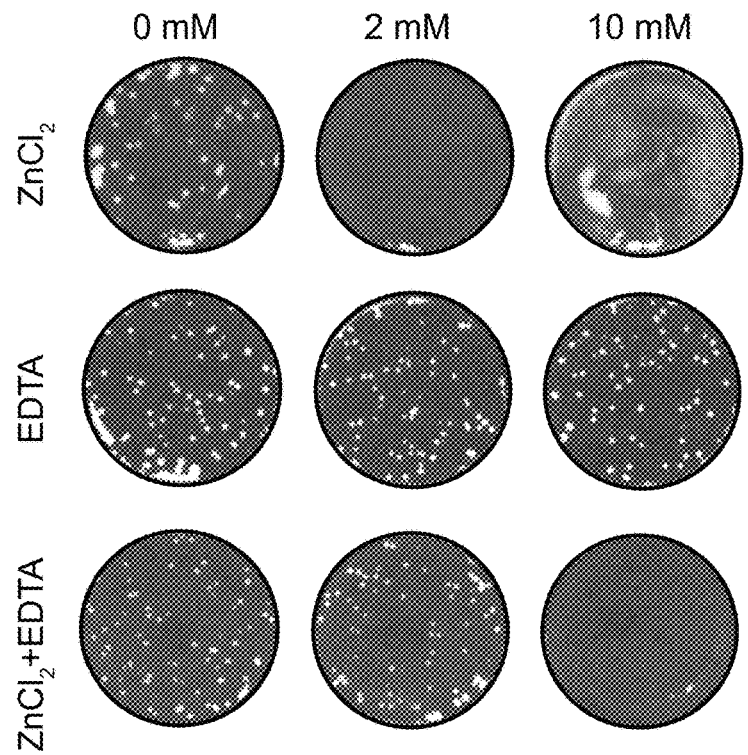
FIG. 2A are plaque assays showing the effect of different zinc chloride and EDTA concentrations on IAV titers as described in Example 2.
Figure 2B:
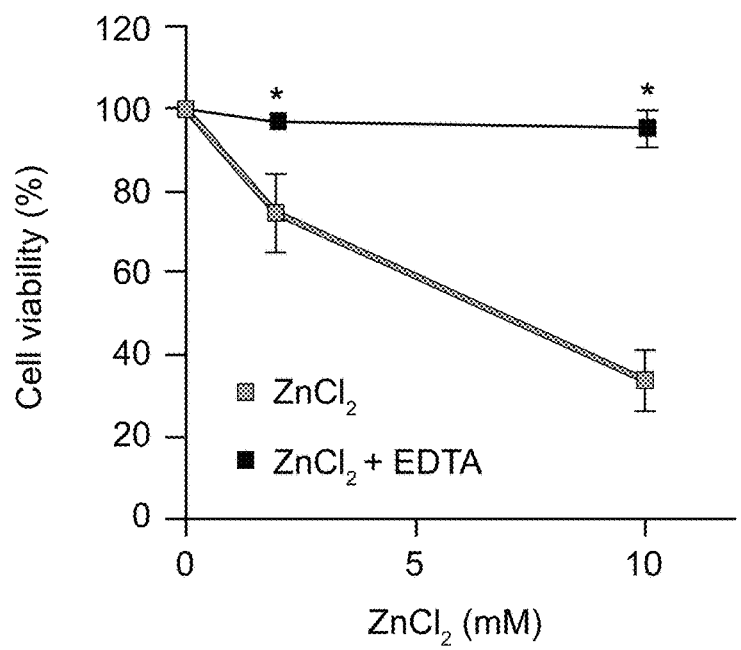
FIG. 2B is a graph showing the cytotoxicity of zinc chloride and EDTA in MDCK cells as described in Example 2.
Figure 2C:
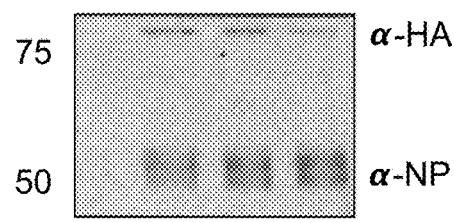
FIG. 2C is a Western blot of IAV HA and NP protein levels after exposure to zinc chloride and neutralization with EDTA as described in Example 2.
Figure 2D:
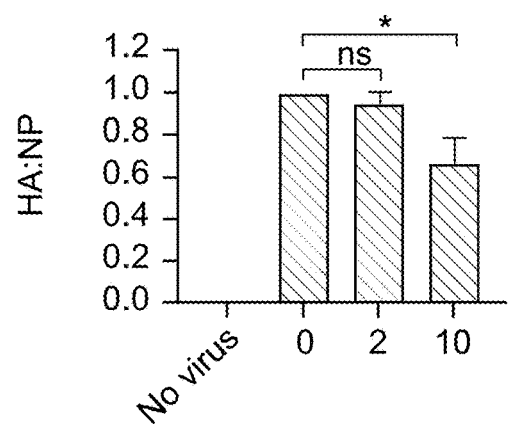
FIG. 2D is a graph of the HA:NP protein levels reported in Example 2.
Figure 2E:
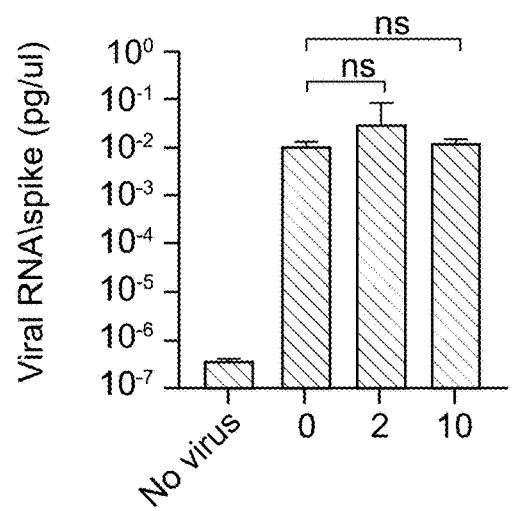
FIG. 2E is a graph showing the NA segment Rt-qPCR analysis of IAV virus after exposure to zinc chloride and neutralization with EDTA.

However, like copper, zinc ions are cytotoxic in tissue culture (see FIG. 2A), which confounds analysis of their effect on viral titers. It was surprisingly found that addition of an equimolar concentration of EDTA after the virus incubation with zinc ions can, beneficially, efficiently chelate zinc and preventing cytotoxic effects (see FIG. 2B). EDTA alone does not have any cytotoxic effects itself or reduce the viral titer (see FIG. 2A). A Western blot IAV HA and NP protein levels after exposure to zinc chloride and neutralization with EDTA is shown in FIG. 2C, as detected with LI-COR. FIG. 2E is a graph of the NA segment RT-qPCR analysis of IAV virus after exposure to zinc chloride and neutralization with EDTA. In these figures, an asterisk indicates p-value, with *=p<0.05, **=p<0.005 and ns=p>0.05.

To investigate if zinc ions can directly inactivate IAV, influenza virus was incubated with varying concentrations of zinc chloride. After 60 min, the reactions were stopped with an equimolar amount of EDTA and subsequently diluted for virus titer determination by plaque assay. As shown in FIG. 2E, a reduction of approximately 2-log on the IAV titer by zinc chloride was observed. To gain more insight into the mechanism of virus inactivation, viral protein levels were analyzed by western blot. For IAV, it was found that in the presence of zinc chloride HA levels were reduced in a concentration-dependent manner, while NP levels did not diminish as shown in FIG. 2D. To test if IAV RNA levels were affected, a 120-nt long spike RNA was added to each sample, viral RNA was extracted, and reverse transcriptions was performed using a 3' terminal NA primer. cDNA levels were next quantified using qPCR of the NA gene-encoding segment. No effect of zinc chloride on viral NA segment levels was found. Together, these results indicate that zinc ions can inactivate an IAV (H1N1) strain by destabilization of the viral surface proteins.

The above results show that zinc ions, as disclosed and described herein, can directly inactivate an IAV H1N1 strain. And, EDTA can efficiently chelate zinc ions in solution and prevent any false positive virus inactivation when testing.

Example 3—Deactivation of Virus in Fabrics

In the following examples, the hygroscopic polymer used was polyamide 66 from Ascend Performance Materials and the zinc ion was added using zinc ammonium adipate obtained from Microban. The polymer was formed into filament yarn and knitted into different fabrics for testing. Unprocessed and dyed fabrics were tested. The polymers tested are shown in Table 2. A comparative example using having no zinc was also tested.

TABLE 2

| Example | Polymer | Processed | Zinc Ion (wppm) | Basis Weight (gsm) | Fiber Diameter (microns) |
|---|---|---|---|---|---|
| 3-A | PA 6,6 | Dyed | 328 | 186 | 11 |
| 3-B | PA 6,6 | Dyed | 328 | 186 | 11 |
| 3-C | PA 6,6 | — | 447 | 157 | 11 |
| 3-D | PA 6,6 | — | 447 | 157 | 11 |
| 3-E | PA 6,6 | Greige | 375 | 157 | 11 |
| 3-F | PA 6,6 | Greige | 500 | 157 | 11 |
| Comparative Example A | PA 6,6 | — | 0 | 132 | 11 |

The antiviral efficacy was determined using ISO 18184 (Textiles-Determination of antiviral activity of textile products—2019) testing that was modified to include SARS-CoV-2. The antiviral effect was demonstrated using different types of virus, namely OC43 human coronavirus, H1N1, and SARS-CoV-2.

Figure 3A:
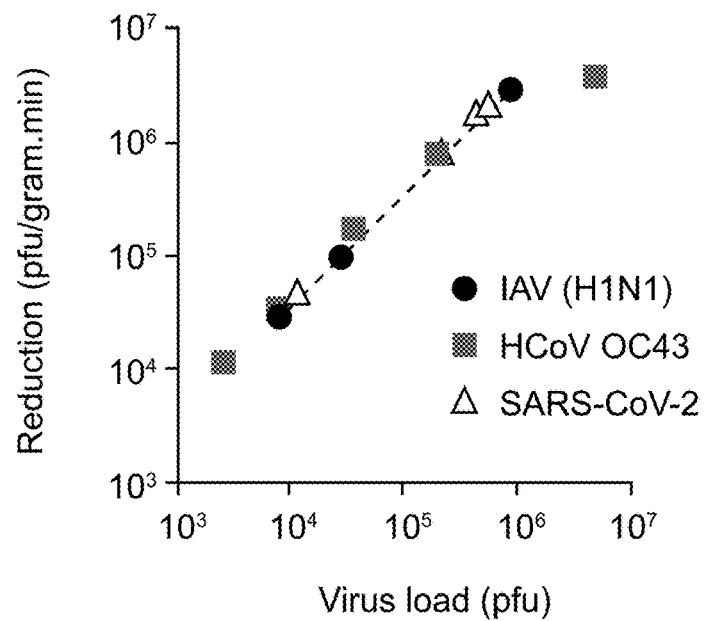
FIGS. 3A and 3B are graphs showing the virus deactivation of the fabric reported in Example 3.

To investigate the robustness and saturation level of the inactivation by fabrics containing embedded zinc oxide, the fabrics were standardized by weight. The viral load was varied and added to each fabric over a range of $10^3$ to $10^7$ pfu. The liquid volume applied to each fabric was kept constant. After incubation for different periods of time (0, 5, 20, 60 and 120 minutes), fabrics were washed with PBSTE and virus titers estimated by plaque assay or focal forming assay. Example 3-A was tested for H1N1, and SARS-CoV-2 as shown in the virus reduction (pfu/ml) in FIG. 3A.

For testing SARS-CoV-2 a modified ISO 18184:2019 was used for Examples 3-A, 3-B and Comparative Example A. The neutralization broth was a SCDLPTE broth that was soya casein digest lecithin polysorbate broth with 0.5% tween-80 and 10 mM EDTA.

For Examples 3-A and 3-B, three samples of 0.4 grams of fabric were placed flat in a 10 cm Petri dish, respectively. Next, 200 μl of virus inoculum was added to each Test Article and exposed for 30 sec, 5 min, 20 min, 60 min, or 120 min. Next, the Test Article was transferred to a 50 ml tube. Then 1800 μl of SCDLPTE was added to the Test Article and the tube extensively vortexed. Finally, 1 ml of SCDLPTE and virus were removed from the 50 ml tube and transferred to an Eppendorf tube for plaque assay.

For Comparative Example A, one sample of 0.4 grams of fabric was placed flat in a 10 cm Petri dish. Next, 200 μl of virus inoculum was added to the Control Article and exposed for 5 min or 120 min. Next, the Control Article was transferred to a 50 ml tube. Then 1800 μl of SCDLPTE was added to the Control Article and the tube extensively vortexed. Finally, approximately 2 ml of SCDLPTE and virus were removed from the 50 ml tube and transferred to an Eppendorf tube for plaque assay.

Plaque or TCID50 assays were performed with samples from 6.1 and 6.2. Plaque assays were performed on Vero E6 cells with 250 ul of 10-fold dilutions (100 to 10-3) of viral suspension (or no virus control) for 60 min at room temperature. Plaque assays were incubated for 2 days at 37° C. Cells were fixed in 4% formaldehyde and stained with Chrystal Violet. Plaque forming units (PFU) were counted to determine infectious viral titers (PFU/ml).

Figure 3B:
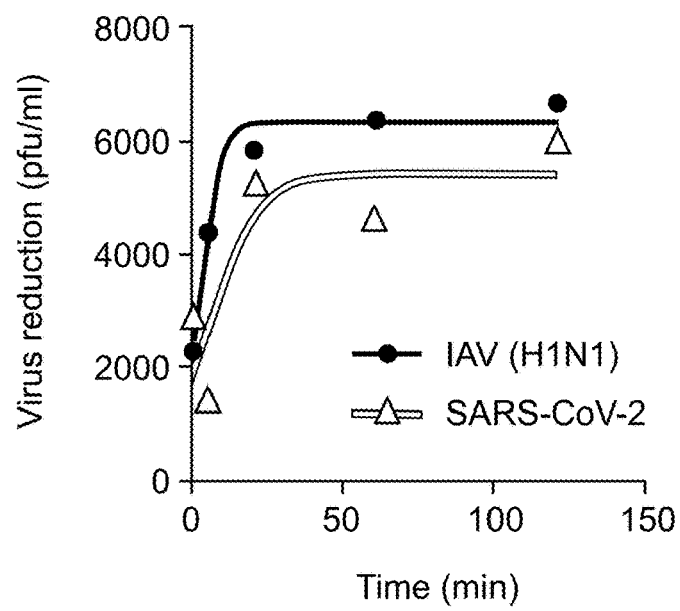

As shown, Example 3-A demonstrates the effect on the reduction rate of IAV, HCov OC43, and SARS-CoV-2 titer after exposure. Data points were obtained by from time courses experiments in which viral load was varied and subsequently estimated the maximum reduction rate (exponential phase) for each time course. Reduction was normalized to pfu·gram$^{-1}$·min$^{-1}$ using the dry fabric weight. IAV, HCov OC43, and SARS-CoV-2 data points were fit with a linear line and no difference was observed between the fits as shown in FIG. 3B. $R^2$ for IAV fit is shown. Together, these results suggest that IAV and coronaviruses are efficiently inactivated by fabrics containing embedded zinc ions.

Figure 3C:
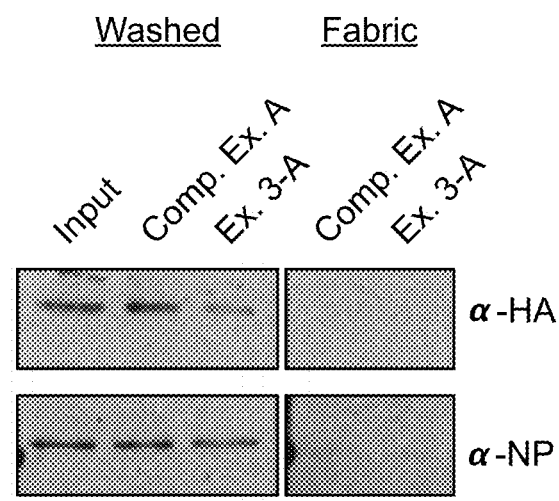
FIG. 3C is a Western blot for the viral reduction show the graph in FIG. 3D for the fabric reported in Example 3.
Figure 3D:
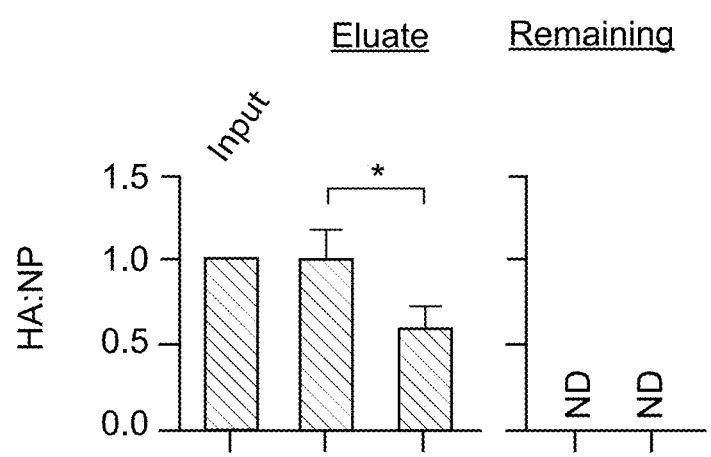
FIG. 3E is a Western blot for the viral reduction show the graph in FIG. 3F for the fabric reported in Example 3.
Figure 3E:
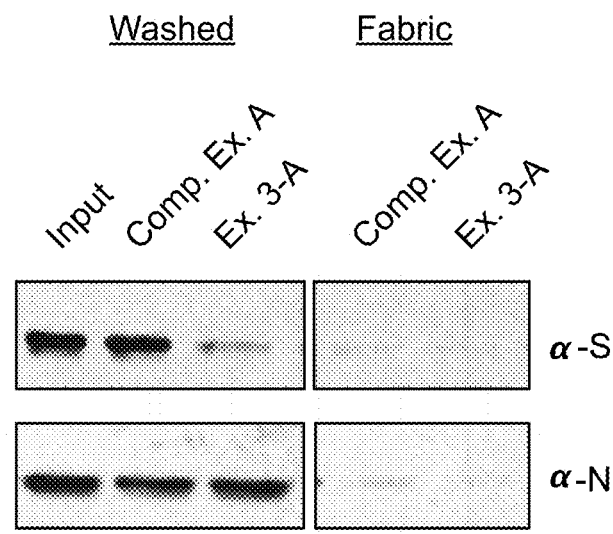
Figure 3F:
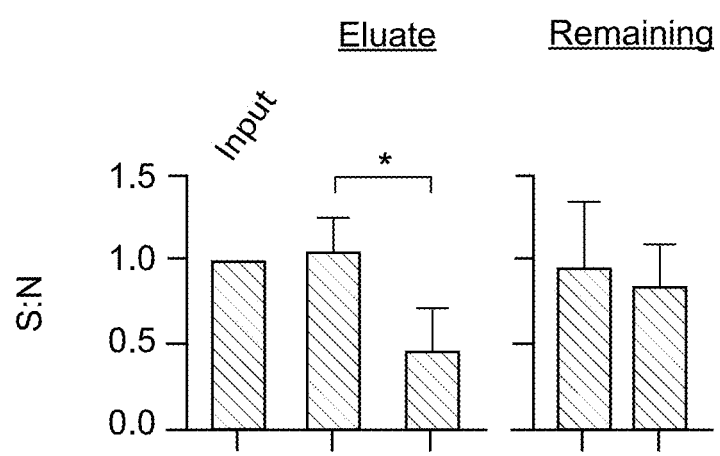

FIG. 3C is a Western blot analysis of IAV HA and NP protein levels after exposure of IAV to the fabric of Example 3-A and comparative example A. Both the virus that was removed (eluate) from each fabric with PBSTE as well as the virus that remained on each fabric was analyzed and reported in FIG. 3D. Similarly, a Western blot analysis of SARS-CoV-2 S and N protein levels after exposure of virus to the Example 3-A and comparative example A as shown in FIG. 3E. Both the virus that was removed (eluate) from each fabric with PBSTE as well as the virus that remained on each fabric were analyzed and reported in FIG. 3F.

Additional results for the fabrics of Table 2 are reported in Table 3 using similar tests. The results were taken after 20 or 60 minutes.

TABLE 3

| Example | ISO 18184-OC43-Human Coronavirus | | ISO 18184 H1N1-Influenza | | ISO 18184 SARS-CoV-2 | |
|---|---|---|---|---|---|---|
| | 20 mins | 60 mins | 20 mins | 60 mins | 60 mins | 60 mins |
| 3-A | | | 1.77 | | 4.15 | 1.23 |
| 3-B | | | 1.77 | | 4.15 | 2.61 |
| 3-C | 5.27 | | 2.49 | | | |
| 3-D | 1.57 | | 2.79 | | | |
| 3-E | 1.55 | | 2.19 | | | |
| 3-F | 4.88 | | 2.19 | | | |
| Comparative Example A | 0.11 | 0.37 | 0.24 | | | 0.39 |

RT-qPCR analysis of the viral RNA showed no significant reduction in viral RNA integrity after treatment with zinc (or copper). By contrast, analysis of the stability of the viral surface and capsid proteins revealed a reduced stability of the virus surface proteins HA and S, for IAV and SARS-CoV-2, respectively, after exposure to zinc and aberrant migration of these proteins after exposure to copper ions. There was no effect on the viral nucleoprotein, which allowed use of the viral nucleoprotein as internal control. A similar altered surface protein to nucleoprotein ratio on the zinc-embedded PA66 fabrics was observed. Together, these results suggest that the reduction in virus titer after exposure to the zinc ions derives from inactivation of the viral surface proteins.

Example 4—Durability of Filament Yarns

To investigate if fabrics constructed from fibers containing zinc oxide maintain their zinc oxide content after washing, a PA66 fabric with 500 ppm zinc oxide was washed 25 or 50 times using the standardized home laundry test protocol AATCC M6-2016. Subsequent analysis of the zinc oxide (zinc ion) content after washing revealed that zinc remained present in fabrics for up to 50 washes (see FIGS. 4A and 4B). Analysis of the reduction in IAV titer on these fabrics demonstrated only a minor reduction in reduction, suggesting that these fabrics are suitable for reuse.

Figure 4A:
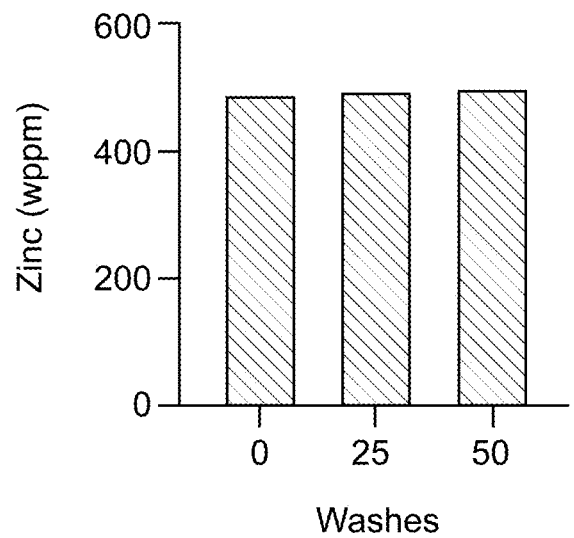
FIGS. 4A and 4B are graphs of the results for the retention testing described in Example 4.
Figure 4B:
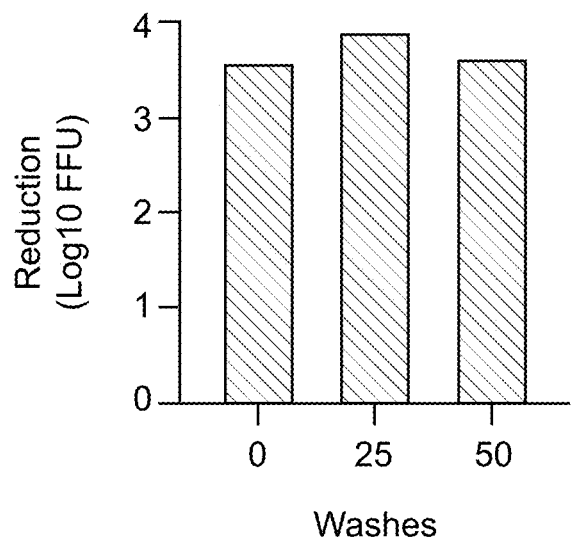

A sample of a hygroscopic polymer, (PA66) having a zinc ion concentration of 488 wppm with a basis weight of 147 gsm and an average fiber diameter of 11 microns was repeatedly wash to demonstrate the retention and durable anti-viral characteristics. The knit was an H7120 interlock. The testing was done after 1, 25, and 50 washes and the results shown in FIGS. 4A and 4B are also captured in Table 4.

TABLE 4

| # of washes | Zinc ion (wppm) | Zinc retention | ISO 18184 - OC43 - Human Coronavirus (60 mins) | ISO 18184 H1N1 - Influenza (60 mins) | ISO 18184 SARS-CoV-2 (60 mins) |
|---|---|---|---|---|---|
| Initial | 488 | — | 6.32 | 3.23 | 1.04 |
| 1x | 522 | >99% | 2.81 | 1.92 | 2.11 |
| 25x | 499 | >99% | 6.16 | 2.74 | 1.96 |
| 50x | 505 | >99% | 3.46 | 2.29 | 1.66 |

EMBODIMENTS

As used below, any reference to a series of embodiments is to be understood as a reference to each of those embodiments disjunctively (e.g., "Embodiments 1-4" is to be understood as "Embodiments 1, 2, 3, or 4").

Embodiment 1 is an antiviral article comprising a textile having a basis weight of greater than or equal to 15 gsm, the textile comprising filament yarn comprising one or more hygroscopic polymers each having an average fiber diameter from 1 to 20 microns; and one or more metal ions incorporated within the one or more hygroscopic polymers for deactivating viruses exposed to the article, wherein the concentration of the one or more metal ions is greater than or equal to 200 wppm.

Embodiment 2 is an antiviral article of Embodiment 1 wherein the one or more hygroscopic polymers comprise a polyamide, polyurethane, polycarbonate, polyesters, polyacrylates, or acrylonitrile butadiene styrene.

Embodiment 3 is an antiviral article comprising a textile having a basis weight of greater than or equal to 15 gsm, the textile comprising filament yarn comprising polyamide having an average fiber diameter from 1 to 20 microns; and one or more metal ions incorporated within the one or more polyamide for deactivating viruses exposed to the article, wherein the concentration of the one or more metal ions is greater than or equal to 200 wppm.

Embodiment 4 is an antiviral article according to Embodiments 2, 3, or 4, wherein the polyamide is the reaction product of at least one $C_4$ to $C_{16}$ aliphatic dicarboxylic acid, cyclo dicarboxylic acid, or aromatic dicarboxylic acid and at least one alkylene diamine having from 2 to 16 carbon atoms or an aromatic diamine.

Embodiment 5 is an antiviral article according to any of the previous embodiments wherein the fabric as a basis weight from 15 to 320 gsm, e.g., from 15 to 300 gsm, e.g., from 30 to 220 gsm, from 35 to 200 gsm, or from 50 to 175 gsm.

Embodiment 6 is an antiviral article according to any of the previous embodiments wherein the one or more hygroscopic polymers each have an average fiber diameter from 2 to 20 microns.

Embodiment 7 is an antiviral article according to any of the previous embodiments wherein the one or more hygroscopic polymers each have an average fiber diameter from 5 to 20 microns.

Embodiment 8 is an antiviral article according to any of the previous embodiments wherein the one or more hygroscopic polymers each have an average fiber diameter from 7 to 20 microns.

Embodiment 9 is an antiviral article according to any of the previous embodiments wherein the one or more hygroscopic polymers each have an average fiber diameter from 8 to 20 microns.

Embodiment 10 is an antiviral article according to any of the previous embodiments wherein the one or more hygroscopic polymers each have an average fiber diameter from 10 to 20 microns.

Embodiment 11 is an antiviral article according to any of the previous embodiments wherein the one or more hygroscopic polymers each have an average fiber diameter from 10 to 19 microns.

Embodiment 12 is an antiviral article according to any of the previous embodiments wherein the one or more hygroscopic polymers each have an average fiber diameter from 10 to 18 microns.

Embodiment 13 is an antiviral article according to any of the previous embodiments wherein the metal ions comprise zinc ions, copper ions, or silver ions.

Embodiment 14 is an antiviral article according to any of the previous embodiments wherein the metal ions comprise zinc ions.

Embodiment 15 is an antiviral article according to any of the previous embodiments wherein the concentration of the one or more metal ions is from 200 wppm to 1,000 wppm.

Embodiment 16 is an antiviral article according to any of the previous embodiments further comprising one or more metal compounds, and the one or more metal compounds comprise oxides, carbonates, stearates, pyrithiones, or adipates.

Embodiment 17 is an antiviral article according to any of the previous embodiments wherein the concentration of the one or more metal ions exceeds the concentration of one or more metal compounds.

Embodiment 18 is an antiviral article according to any of the previous embodiments wherein the one or more metal ions incorporated within the one or more hygroscopic polymers for deactivating viruses exposed to the article, wherein the virus is an adenovirus, a herpesvirus, a poxvirus, a rhinovirus, a coxsackievirus, an enterovirus, a morbillivirus, a coronavirus, an influenza A virus, an avian influenza virus, a swine-origin influenza virus, or an equine influence virus.

Embodiment 19 is an antiviral article according to any of the previous embodiments wherein the article exhibits at least a 1-log reduction of human coronavirus after a period of 60 minutes according to ISO 18184:2019.

Embodiment 20 is an antiviral article according to any of the previous embodiments wherein the article exhibits at least a 2-log reduction of human coronavirus after a period of 60 minutes according to ISO 18184:2019.

Embodiment 21 is an antiviral article according to any of the previous embodiments wherein the article exhibits at least a 3-log reduction of human coronavirus after a period of 60 minutes according to ISO 18184:2019.

Embodiment 22 is an antiviral article according to any of the previous embodiments wherein the article exhibits at least a 1-log reduction of H1N1 after a period of 60 minutes according to ISO 18184:2019.

Embodiment 23 is an antiviral article according to any of the previous embodiments wherein the article exhibits at least a 2-log reduction of H1N1 after a period of 60 minutes according to ISO 18184:2019.

Embodiment 24 is an antiviral article according to any of the previous embodiments wherein the article exhibits at least a 3-log reduction of H1N1 after a period of 60 minutes according to ISO 18184:2019.

Embodiment 25 is an antiviral article according to any of the previous embodiments wherein the article exhibits at least a 1-log reduction of Sars-CoV-2 after a period of 60 minutes according to ISO 18184:2019.

Embodiment 26 is an antiviral article according to any of the previous embodiments wherein the article exhibits at least a 2-log reduction of Sars-CoV-2 after a period of 60 minutes according to ISO 18184:2019.

Embodiment 27 is an antiviral article according to any of the previous embodiments wherein the article exhibits at least a 3-log reduction of Sars-CoV-2 after a period of 60 minutes according to ISO 18184:2019.

Embodiment 28 is an antiviral article according to any of the previous embodiments wherein the filament yarn further comprises an phosphorus compound and wherein the phosphorus compound comprises benzene phosphinic acid, phosphorous acid, or manganese hypophosphite, or combinations thereof.

Embodiment 29 is an antiviral article according to any of the previous embodiments wherein the article is reusable.

Embodiment 30 is an antiviral article according to any of the previous embodiments wherein the article has a metal ion retention rate of greater than or equal to 65%.

Embodiment 31 is an antiviral article according to any of the previous embodiments wherein the article comprises a mask, wipe, gown, towel, protective clothing, or protective net.

Embodiment 32 is an antiviral article according to any of the previous embodiments wherein the textile is woven.

Embodiment 33 is an antiviral article according to any of the previous embodiments wherein the textile is knitted.

Embodiment 34 is an antiviral article according to any of the previous embodiments the filament yarn comprises linear denier per filament (dpf) less than or equal to 12 dpf.

Embodiment 35 is an antiviral article according to any of the previous embodiments the filament yarn comprises linear denier per filament (dpf) from 1 dpf to 12 dpf.

Embodiment 36 is an antiviral article according to any of the previous embodiments the filament yarn comprises linear denier per filament (dpf) from 1 dpf to 10 dpf.

Embodiment 37 is an antiviral filament yarn comprising one or more hygroscopic polymers each having an average fiber diameter from 1 to 20 microns and one or more metal ions incorporated within the one or more hygroscopic polymers for deactivating viruses exposed to the yarn, wherein the concentration of the one or more metal ions is greater than or equal to 200 wppm; and wherein the filament yarn is woven or knitted into a textile.

Embodiment 38 is an antiviral filament yarn according to Embodiment 37, wherein the filament yarn comprises linear denier per filament (dpf) less than or equal to 12 dpf.

Embodiment 39 is an antiviral filament yarn according to Embodiment 37, wherein the filament yarn comprises linear denier per filament (dpf) from 1 dpf to 12 dpf.

Embodiment 40 is an antiviral article according to Embodiment 37, wherein the filament yarn comprises linear denier per filament (dpf) from 1 dpf to 10 dpf.

Embodiment 41 is an antiviral filament yarn of Embodiments 37-40 wherein the one or more hygroscopic polymers comprise a polyamide, polyurethane, polycarbonate, polyesters, polyacrylates, or acrylonitrile butadiene styrene.

Embodiment 42 is an antiviral filament yarn according to Embodiment 41, wherein the polyamide is the reaction product of at least one $C_4$ to $C_{16}$ aliphatic dicarboxylic acid, cyclo dicarboxylic acid, or aromatic dicarboxylic acid and at least one alkylene diamine having from 2 to 16 carbon atoms or an aromatic diamine.

Embodiment 43 is an antiviral filament yarn according to Embodiments 37-42, wherein the one or more hygroscopic polymers each have an average fiber diameter from 2 to 20 microns.

Embodiment 44 is an antiviral filament yarn according to Embodiments 37-43, wherein the one or more hygroscopic polymers each have an average fiber diameter from 5 to 20 microns.

Embodiment 45 is an antiviral filament yarn according to Embodiments 37-44, wherein the one or more hygroscopic polymers each have an average fiber diameter from 7 to 20 microns.

Embodiment 46 is an antiviral filament yarn according to Embodiments 37-45, wherein the one or more hygroscopic polymers each have an average fiber diameter from 8 to 20 microns.

Embodiment 47 is an antiviral filament yarn according to Embodiments 37-46, wherein the one or more hygroscopic polymers each have an average fiber diameter from 10 to 20 microns.

Embodiment 48 is an antiviral filament yarn according to Embodiments 37-47, wherein the one or more hygroscopic polymers each have an average fiber diameter from 10 to 19 microns.

Embodiment 49 is an antiviral filament yarn according to Embodiments 37-48, wherein the one or more hygroscopic polymers each have an average fiber diameter from 10 to 18 microns.

Embodiment 50 is an antiviral filament yarn according to Embodiments 37-49, wherein the metal ions comprise zinc ions, copper ions, or silver ions.

Embodiment 51 is an antiviral filament yarn according to Embodiments 37-50, wherein the metal ions comprise zinc ions.

Embodiment 52 is an antiviral filament yarn according to Embodiments 37-51, wherein the concentration of the one or more metal ions is from 200 wppm to 1,000 wppm.

Embodiment 53 is an antiviral filament yarn according to Embodiments 37-52, further comprising one or more metal compounds, and the one or more metal compounds comprise oxides, carbonates, stearates, pyrithiones, or adipates.

Embodiment 54 is an antiviral filament yarn according to Embodiments 37-53, wherein the concentration of the one or more metal ions exceeds the concentration of one or more metal compounds.

Embodiment 55 is an antiviral filament yarn according to Embodiments 37-54, wherein the article has a metal ion retention rate of greater than or equal to 65%.

We claim:

1. An antiviral article comprising:
    a textile having a basis weight of greater than or equal to 15 gsm, the textile comprising filament yarn comprising:
        one or more hygroscopic polymers each having an average fiber diameter from 1 to 20 microns;
        one or more metal ions incorporated within the one or more hygroscopic polymers for deactivating viruses exposed to the article, wherein the concentration of the one or more metal ions is greater than or equal to 200 wppm; and
        a phosphorus compound and wherein the phosphorus compound comprises benzene phosphinic acid, phosphorous acid, or manganese hypophosphite, or combinations thereof, wherein the metal ion is a zinc ion and wherein the molar ratio of the phosphorus to the zinc ranges from 0.01:1 to 3:1.

2. The article of claim 1, wherein the one or more hygroscopic polymers comprise a polyamide, polyurethane, polycarbonate, polyesters, polyacrylates, or acrylonitrile butadiene styrene.

3. The article of claim 2, wherein the polyamide is the reaction product of at least one $C_4$ to $C_{16}$ aliphatic dicarboxylic acid, cyclo dicarboxylic acid, or aromatic dicarboxylic acid and at least one alkylene diamine having from 2 to 16 carbon atoms or an aromatic diamine.

4. The article of claim 1, wherein the one or more hygroscopic polymers absorbs more than 0.3% of moisture based on the weight of the one or more hygroscopic polymers.

5. The article of claim 1, wherein the fabric as a basis weight from 15 to 320 gsm.

6. The article of claim 1, wherein the one or more hygroscopic polymers each have an average fiber diameter from 10 to 20 microns.

7. The article of claim 1, wherein the concentration of the one or more metal ions is from 200 wppm to 1,000 wppm.

8. The article of claim 1, wherein the article exhibits at least a 1-log reduction of human coronavirus after a period of 60 minutes according to ISO 18184:2019.

9. The article of claim 1, wherein the article exhibits at least a 1-log reduction of H1N1 after a period of 60 minutes according to ISO 18184:2019.

10. The article of claim 1, wherein the article exhibits at least a 1-log reduction of Sars-CoV-2 virus after a period of 60 minutes according to ISO 18184:2019.

11. The article of claim 1, further comprising one or more metal compounds, and the one or more metal compounds comprise oxides, carbonates, stearates, pyrithiones, or adipates.

12. The article of claim 11, wherein the concentration of the one or more metal ions exceeds the concentration of one or more metal compounds.

13. The article of claim 1, wherein the article is reusable.

14. The article of claim 1, wherein the article has a metal ion retention rate of greater than or equal to 65%.

15. The article of claim 1, wherein the article comprises a mask, wipe, gown, towel, protective clothing, or protective net.

16. The article of claim 1, wherein the virus is an adenovirus, a herpesvirus, a poxvirus, a rhinovirus, a coxsackievirus, an enterovirus, a morbillivirus, a coronavirus, an influenza A virus, an avian influenza virus, a swine-origin influenza virus, or an equine influence virus.

* * * * *